US012800784B2

(12) United States Patent
Mizuno et al.

(10) Patent No.: US 12,800,784 B2
(45) Date of Patent: *Nov. 17, 2026

(54) FULL AUTOMATION OF HIGH-RESOLUTION INTERVAL VELOCITY ESTIMATION FOR CHECK-SHOT AND OTHER VERTICAL SEISMIC PROFILE-TYPE DATASETS

(71) Applicant: Schlumberger Technology Corporation, Sugar Land, TX (US)

(72) Inventors: Takashi Mizuno, Houston, TX (US); Joel Herve Le Calvez, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 360 days.

This patent is subject to a terminal disclaimer.

(21) Appl. No.: 18/595,811

(22) Filed: Mar. 5, 2024

(65) Prior Publication Data

US 2024/0427044 A1 Dec. 26, 2024

Related U.S. Application Data

(63) Continuation-in-part of application No. 17/165,239, filed on Feb. 2, 2021, now Pat. No. 11,921,247.

(51) Int. Cl.
*G01V 1/30* (2006.01)
*G01V 1/50* (2006.01)

(52) U.S. Cl.
CPC ................ *G01V 1/307* (2013.01); *G01V 1/50* (2013.01); *G01V 2210/6222* (2013.01); *G01V 2210/63* (2013.01)

(58) Field of Classification Search
CPC .. G01V 1/307; G01V 1/50; G01V 2210/6222; G01V 2210/63
USPC .............................................................. 702/2
See application file for complete search history.

(56) References Cited

U.S. PATENT DOCUMENTS

| | | | | |
|---|---|---|---|---|
| 4,809,239 | A | 2/1989 | Esmersoy | |
| 5,012,453 | A | 4/1991 | Katz | |
| 6,601,671 | B1 * | 8/2003 | Zhao | G01V 1/42 181/108 |
| 7,679,993 | B2 * | 3/2010 | Sayers | G01V 1/30 367/47 |
| 8,750,074 | B2 | 6/2014 | Blias | |
| 8,931,580 | B2 | 1/2015 | Cheng | |

(Continued)

FOREIGN PATENT DOCUMENTS

| | | |
|---|---|---|
| CN | 108952569 A | 12/2018 |
| WO | 2016172006 A1 | 10/2016 |

(Continued)

OTHER PUBLICATIONS

Ba, et al., "Autonomous Directional Drilling Planning and Execution Using an Industry 4.0 Platform", SPE-204607-MS, 2021, presented at the SPE Middle East Oil Gas Show and Conference, Manama, Bahrain, 16 pages.

(Continued)

*Primary Examiner* — Zhen Y Wu
(74) *Attorney, Agent, or Firm* — Jeffrey D. Frantz

(57) ABSTRACT

Embodiments presented provide for a fully automated method of high-resolution interval velocity estimation for vertical seismic profile-type data.

17 Claims, 22 Drawing Sheets

(56) References Cited

U.S. PATENT DOCUMENTS 11,703,607 B2 * 7/2023 Cordery .................. G01V 1/42 702/17
2003/0016164 A1 1/2003 Finke
2006/0153005 A1 * 7/2006 Herwanger ......... E21B 41/0064 367/38
2007/0204994 A1 9/2007 von Wimmersperg
2009/0236092 A1 9/2009 O'Brien
2010/0185395 A1 7/2010 Pirovolou
2010/0286919 A1 * 11/2010 Lee .......................... G01V 1/28 702/18
2012/0285701 A1 11/2012 Cheng
2014/0032192 A1 1/2014 Zamora
2015/0205002 A1 * 7/2015 Liang ..................... G01V 1/303 703/2
2015/0300859 A1 * 10/2015 Khulief ..................... G01F 1/28 73/861.04
2015/0330209 A1 11/2015 Panchal
2016/0091621 A1 3/2016 Buland
2017/0211372 A1 7/2017 Samuel
2017/0285195 A1 * 10/2017 Pei ........................... G01V 1/42
2017/0306702 A1 10/2017 Summers
2018/0051552 A1 2/2018 Li
2018/0106133 A1 4/2018 Bolchover
2018/0135409 A1 * 5/2018 Wilson ..................... G01V 3/30
2018/0203144 A1 7/2018 Karrenbach
2018/0291729 A1 * 10/2018 Wilson .................... E21B 47/13
2018/0340408 A1 11/2018 Samuel
2019/0120039 A1 4/2019 Gillan
2019/0128067 A1 5/2019 Viens
2019/0353023 A1 11/2019 Whitacre
2020/0011167 A1 1/2020 Zhao
2020/0109618 A1 4/2020 Flanagan
2020/0125225 A1 4/2020 Bettles
2020/0256181 A1 8/2020 Jamieson
2020/0277847 A1 9/2020 Rojas
2020/0310389 A1 10/2020 Han
2021/0071477 A1 3/2021 Zhao
2021/0140313 A1 5/2021 Busetti
2021/0208295 A1 * 7/2021 Padhi ..................... G01V 1/282
2021/0301639 A1 9/2021 Fidjestoel
2021/0363872 A1 11/2021 Jamison
2021/0404313 A1 12/2021 Saidutta
2021/0405232 A1 * 12/2021 LeBlanc ................ G01V 1/226
2022/0145746 A1 5/2022 Sadlier
2022/0244416 A1 8/2022 Mizuno et al.
2022/0290550 A1 9/2022 Ba
2022/0316278 A1 10/2022 Pandya
2022/0333443 A1 10/2022 Groover
2023/0025599 A1 1/2023 Fox
2023/0028108 A1 1/2023 Chen
2023/0038752 A1 2/2023 Hamzah
2023/0193750 A1 6/2023 Pogrebinsky
2023/0279727 A1 9/2023 Reagan
2023/0392446 A1 12/2023 Hay
2024/0183263 A1 6/2024 Ba
2024/0247578 A1 7/2024 Ba
2024/0309755 A1 9/2024 Sosareyes
2025/0270925 A1 8/2025 Ba

FOREIGN PATENT DOCUMENTS

WO 2019132929 A1 7/2019
WO 2025038119 A1 2/2025

OTHER PUBLICATIONS

International Search Report and Written Opinion of PCT Application No. PCT/US2022/018728 dated Jun. 16, 2022, 8 pages.
Non Final Office Action and 892 of U.S. Appl. No. 17/653,404 dated on Sep. 28, 2024, 31 Pages.
Final Office Action and 892 of U.S. Appl. No. 17/653,404 dated on Jul. 25, 2024, 24 Pages.
Non Final Office Action and 892 of U.S. Appl. No. 17/653,404 dated on Apr. 25, 2024, 27 Pages.
Extended Search Report issued in European Patent Application No. 22764063.8 dated Dec. 10, 2024, 12 pages.
Final Office Action and 892 of U.S. Appl. No. 17/653,404 dated Jan. 16, 2025, 10 pages.
Li F., "Investigation into phantom downlinks and development of a prevention algorithm in rotary steerable system", Petroleum, 2021, 7(3), pp. 349-355.
Liu, Q. et al., "Continuous Feedback Loop Between Surface and Downhole for Autonomously Drilling a Section", SPE-218117-MS presented at the SPE Canadian Energy Technology Conference and Exhibition, Calgary, Alberta, CA, 2024, 12 pages.
Correa, J., A. Egorov, K. Tertyshnikov, A. Bona, R. Pevzner, T. Dean, B. Freifeld, and S. Marshall, 2017, Analysis of signal to noise and directivity characteristics of DAS VSP at near and far offsets—A CO2CRC Otway Project data example: The Leading Edge, 36, 994a1-994a7.
Daley, T.M., D.E. Miller, K. Dodds, P. Cook., and B.M. Vreifeld, 2016, Field testing of modular borehole monitoring with simultaneous distributed acoustic sensing and geophone vertical seismic profiles at Citronelle, Alabama: Geophysical Prospecting, 64, 1318-1334.
Mizuno, T., S. Leaney, J. L. Calvez, F. Naseer, M. L. Khaitan, 2019. The significance of gauge length in particle velocity estimation from DAS data: VSP and microseismic cases: SEG Annual Meeting Expanded Abstracts, 4869-4873.
International Search Report and Written Opinion of International Patent Application No. PCT/US2022/014684 dated May 4, 2022, 10 pages.
Salgado et al., Interpretation of large-Strain Seismic cross-hole tests, Joural of Geotechnical and Geoenvironmental Engineering, Apr. 1997 (Year: 1997).
Zhang et al., Seismic Wave simulation by velocity-stress wave equations in two-phase anisotropic media, Journal of Geophysics and Engineering 2014, vol. 11 (Year: 2014).

* cited by examiner

FULL AUTOMATION OF HIGH-RESOLUTION INTERVAL VELOCITY ESTIMATION FOR CHECK-SHOT AND OTHER VERTICAL SEISMIC PROFILE-TYPE DATASETS

CROSS-REFERENCE TO RELATED APPLICATIONS

This application is a Continuation-In-Part of U.S. Non-Provisional application Ser. No. 17/165,239 filed on Feb. 2, 2021, which has issued as U.S. Pat. No. 11,921,247 on Mar. 5, 2024, and which is hereby incorporated by reference in its entirety for all purposes.

FIELD OF THE DISCLOSURE

Aspects of the disclosure relate to analysis of seismic data. More specifically, aspects of the disclosure relate to automation methods for obtaining velocity estimations, without a need for time picking of analysis intervals.

BACKGROUND

Borehole seismic projects attempt to estimate the P and S wave velocities along a wellbore trajectory by measuring speed of seismic wave recorded at the borehole. As the type of boreholes and geometries can vary, there are many different types of overall configurations that may be present. FIG. 1A-1M present different types of applications where borehole seismic may be used. In FIG. 1A, for example, check-shot vertical seismic profile (VSP) and zero-offset VSP (FIG. 1E), are the most fundamental configurations to be considered since they give P and S wave velocity along the borehole. As illustrated in FIG. 1A, a derrick 101 is positioned to prepare a wellbore 100. A seismic source 102 is configured to send a sonic pulse 104 into the geological stratum. FIGS. 1B-1M provide different types of embodiments that provide seismic pulses in different configurations. As provided in FIG. 1B, a multiple pattern from multiple sources is illustrated. In FIG. 1C, multiple seismic sources 112 are provided in the wellbore. In FIG. 1H, a wave form pattern 110 is created from different sources. In different embodiments, an artificial seismic source is deployed close to the borehole wellhead, and the arrival of the direct P wave (and sometimes both P- and S-waves) is recorded using downhole sensors.

Variations of P and S wave velocity may be inferred in terms of propagation direction (anisotropy) by using several different configurations including offset VSP (FIG. 1G), vertical incidence VSP, walkabove VSP (FIG. 1D), walkaround VSP (FIG. 1I), 3D VSP (FIG. 1M). Those surveys provide critical information for seismic imaging and reservoir characterization. In addition to those FIGS. described above, other geometries and variations are shown as examples of different configurations and methods used.

Traditionally, the borehole seismic industry has used three-component (3C) sensors. Recently, fiber-based system such as heterodyne Distributed Acoustic Sensing (hDVS) systems or Distributed Acoustic Sensing (DAS) systems, have seen popularity increasing due to the low-cost of deployment and associated low acquisition time. However, those systems are one-component (1C) acquisition systems.

Traditional approaches to data obtained from the different systems and geometries described above, rely on an analyst "time-picking" different sets of data obtained. Such choices involve many factors and is a very laborious task. This task slows down analysis and, consequently, activities at the jobsite.

There is a need to provide a method that does not involve tedious analysis, such as picking of time intervals, that is currently performed in conventional analysis.

There is a further need to provide a method that does not have the drawbacks discussed above, namely exhaustive use of operator and analyst time.

There is a still further need to reduce economic costs associated with field and analyst time related to time picking intervals.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method is disclosed. The method may comprise testing and obtaining particle velocity data from at least one geological stratum in a field location. The method may further comprise obtaining strain data from the at least one geological stratum in the field location. The method may further comprise performing a peak-to-peak amplitude analysis for the particle velocity data for a target phase. The method may further comprise performing a peak-to-peak amplitude analysis for the strain data for the target phase. The method may further comprise estimating a velocity of waves in the at least one geological stratum based upon the peak-to-peak amplitude analysis for the particle velocity data for the target phase and the peak-to-peak amplitude analysis for the strain data for the target phase.

In another example embodiment, a method is disclosed. The method may comprise disposing one or more sensors within a borehole, disposing one or more sources on a surface at or proximate a wellhead of the borehole at a field location, and propagating seismic waves using the one or more sources. Further, the method may comprise obtaining particle velocity data from at least one geological stratum in the field location, obtaining strain data from the at least one geological stratum in the field location, performing a peak-to-peak amplitude analysis for the particle velocity data for a target phase, performing a peak-to-peak amplitude analysis for the strain data for the target phase, and estimating a velocity of waves in the at least one geological stratum based upon the peak-to-peak amplitude analysis for the particle velocity data for the target phase and the peak-to-peak amplitude analysis for the strain data for the target phase.

In another example embodiment, a method is disclosed. The method may comprise disposing one or more sensors within a borehole, disposing one or more sources on a surface away from a wellhead of the borehole at a field location, and propagating seismic waves using the one or more sources. Further, the method may comprise obtaining particle velocity data from at least one geological stratum in the field location, obtaining strain data from the at least one geological stratum in the field location, performing a peak-to-peak amplitude analysis for the particle velocity data for a target phase, performing a peak-to-peak amplitude analysis for the strain data for the target phase, and estimating a velocity of waves in the at least one geological stratum based upon the peak-to-peak amplitude analysis for the particle velocity data for the target phase and the peak-to-peak amplitude analysis for the strain data for the target phase.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

Figure 1A:
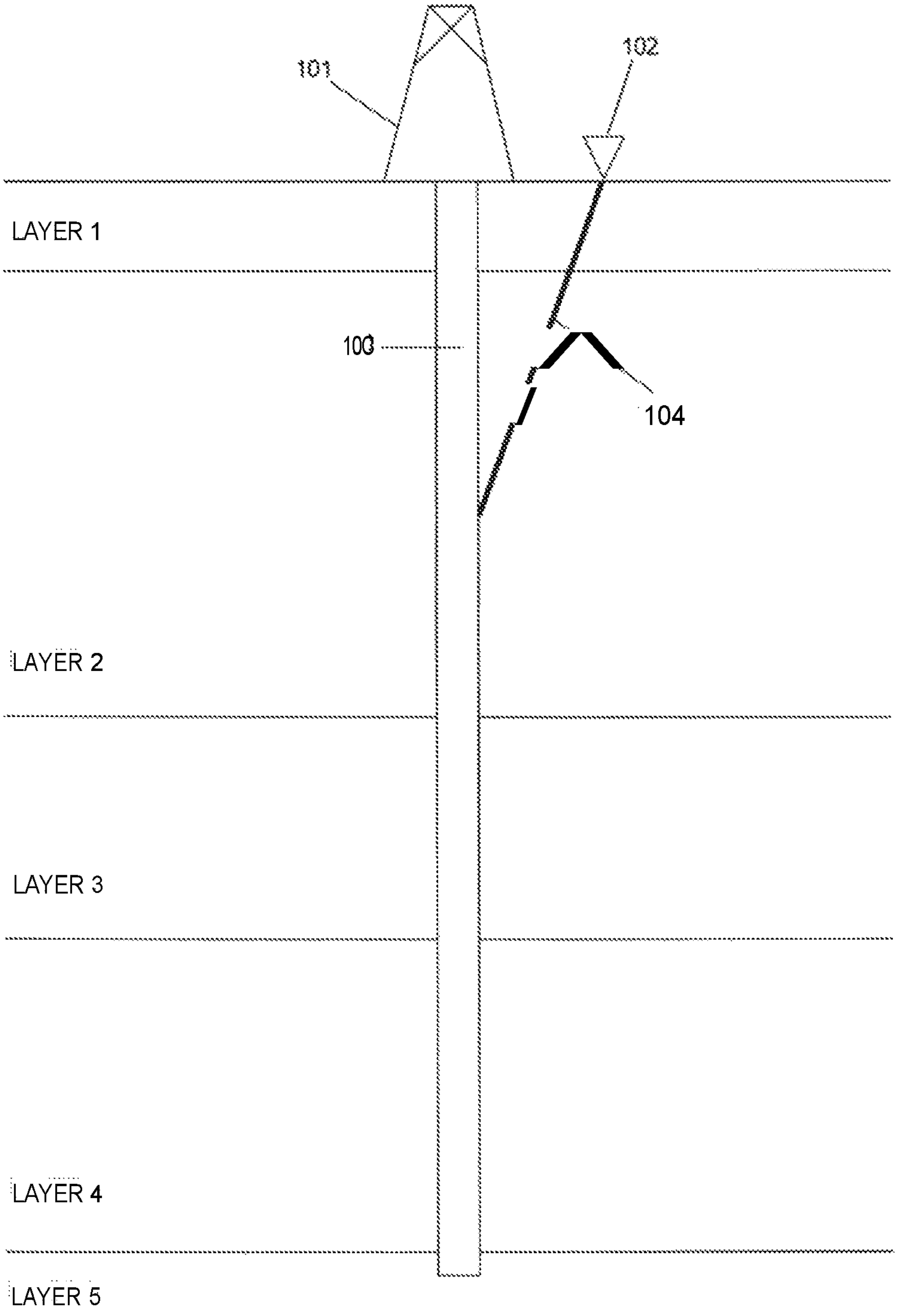
FIG. 1A is a side profile of a check shot vertical seismic profile being performed at a wellbore site.
Figure 1B:
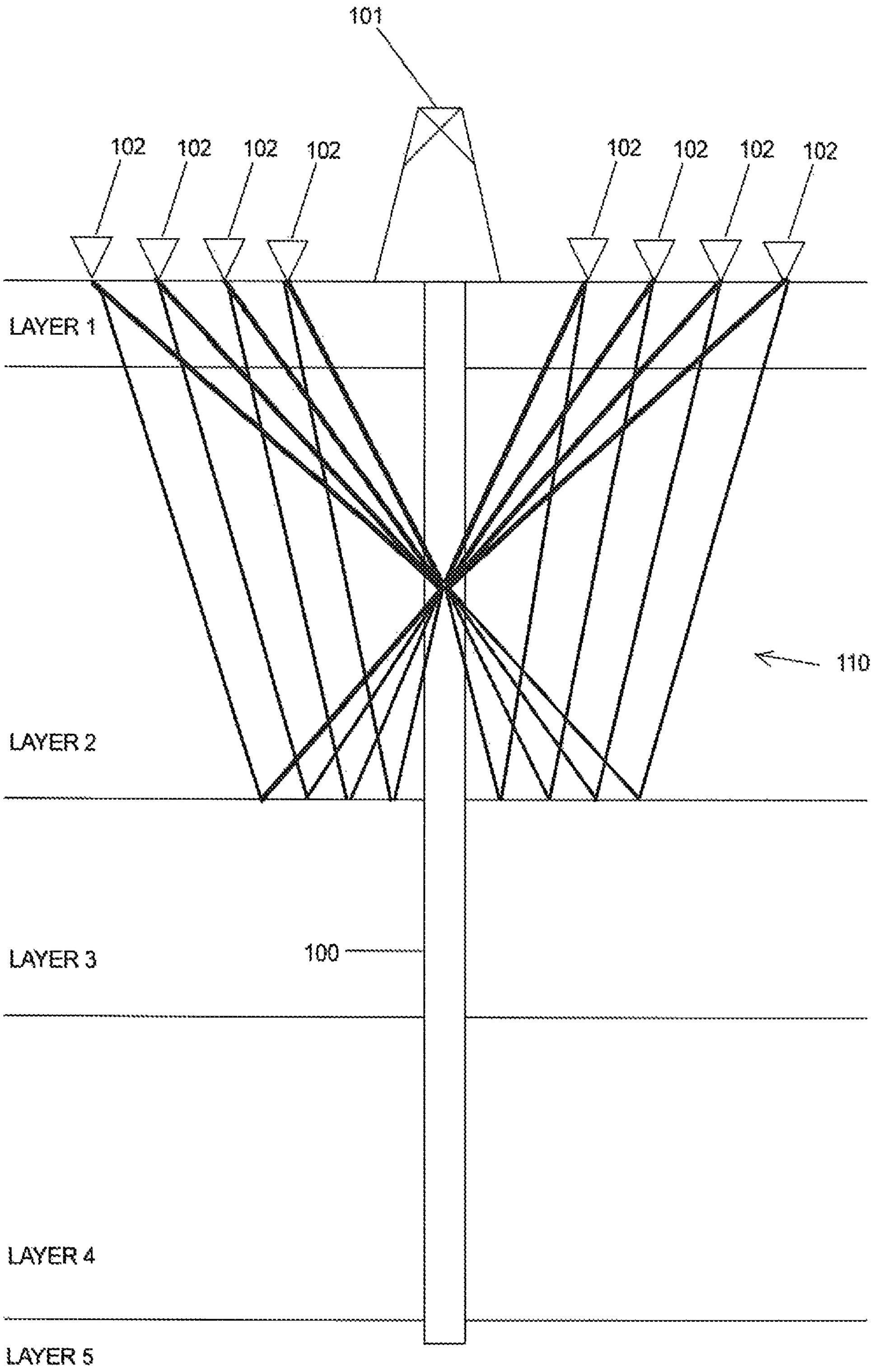
FIG. 1B is a side profile of a walkaway vertical seismic profile being performed at a wellbore site.
Figure 1C:
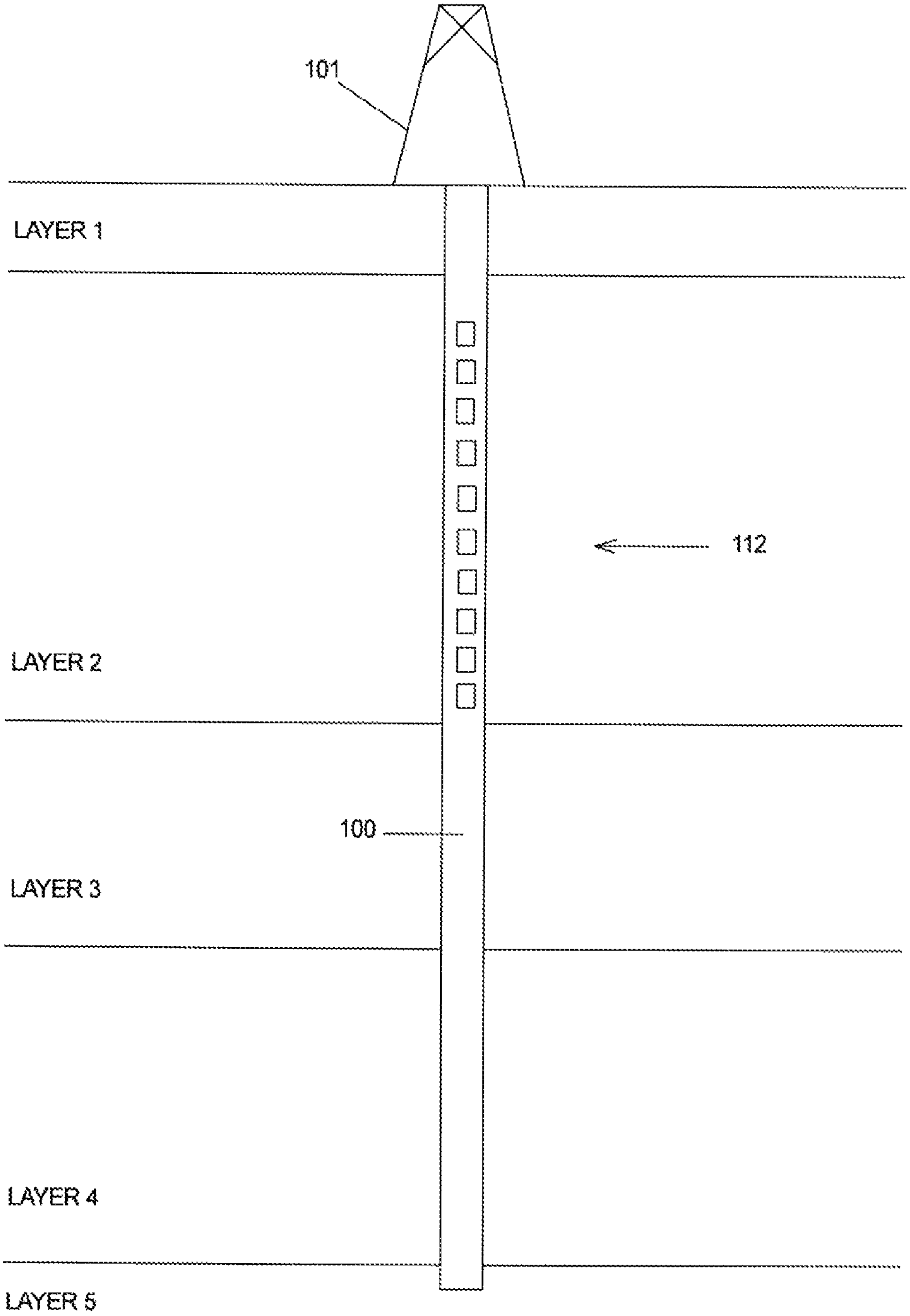
FIG. 1C is a side profile of a monoseismic test being performed at a wellbore site.
Figure 1D:
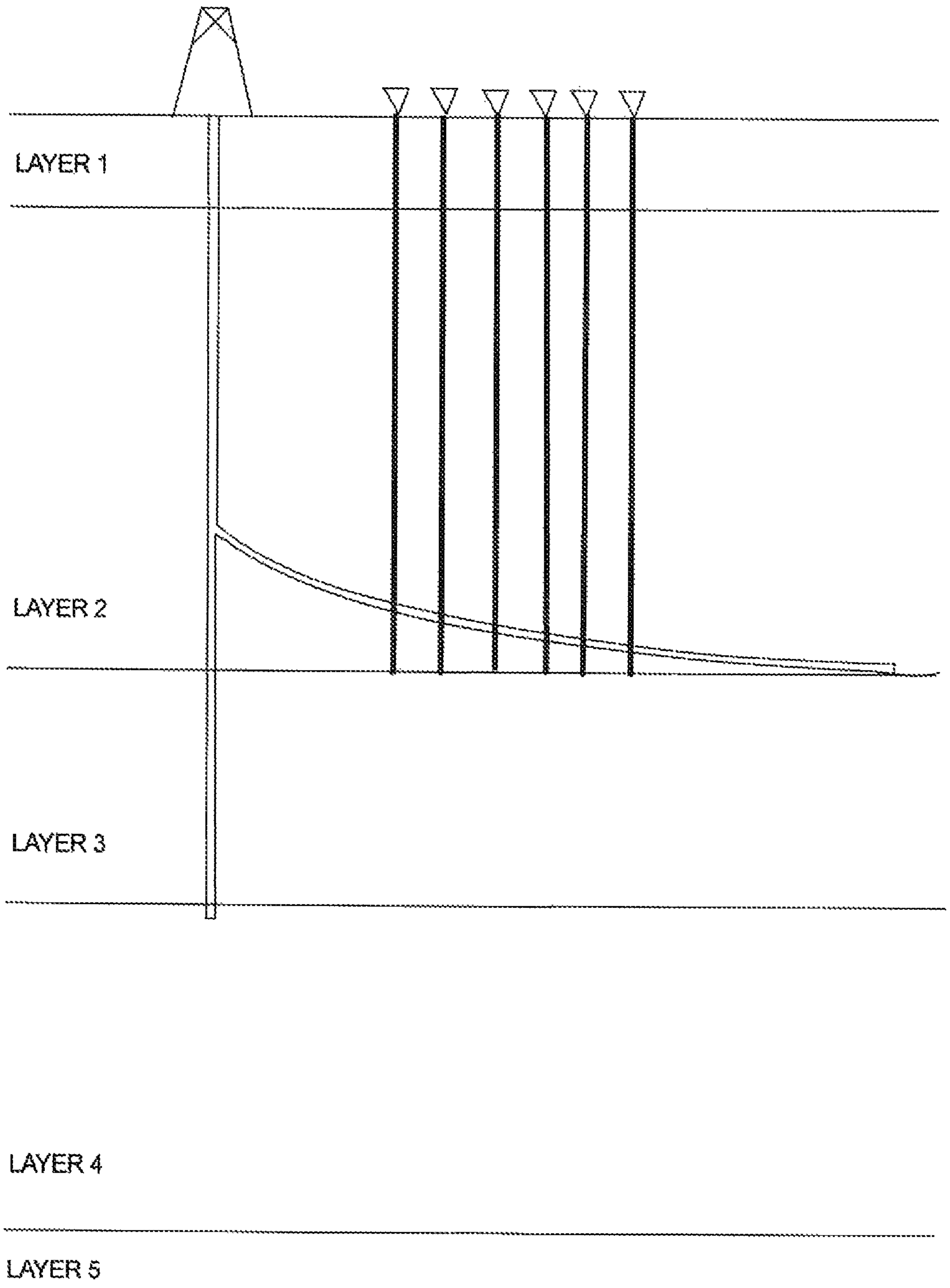
FIG. 1D is a side profile of a walkabove vertical seismic profile test being performed at a wellbore site.
Figure 1E:
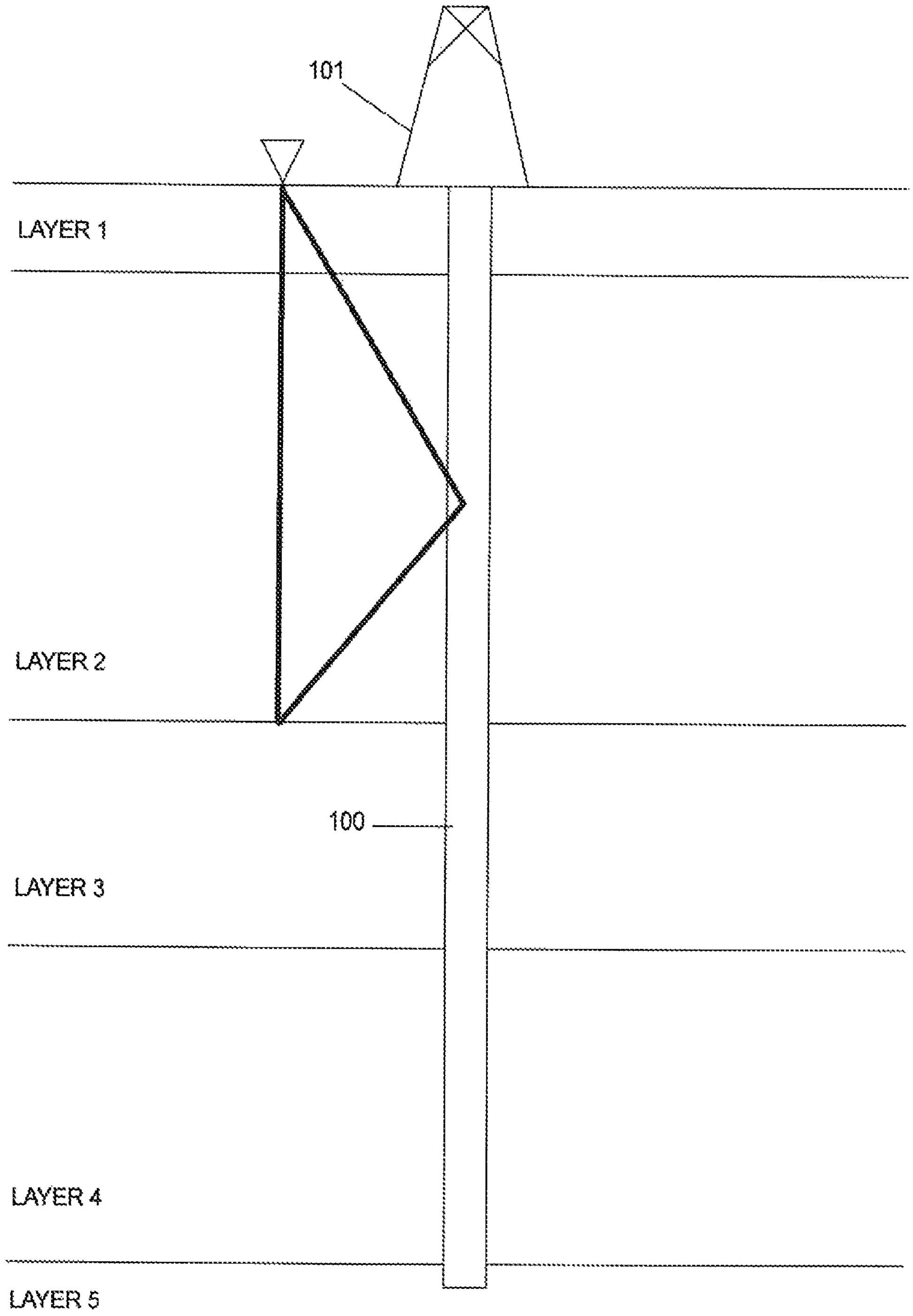
FIG. 1E is a side profile of a zero-offset vertical seismic profile being performed at a wellbore site.
Figure 1F:
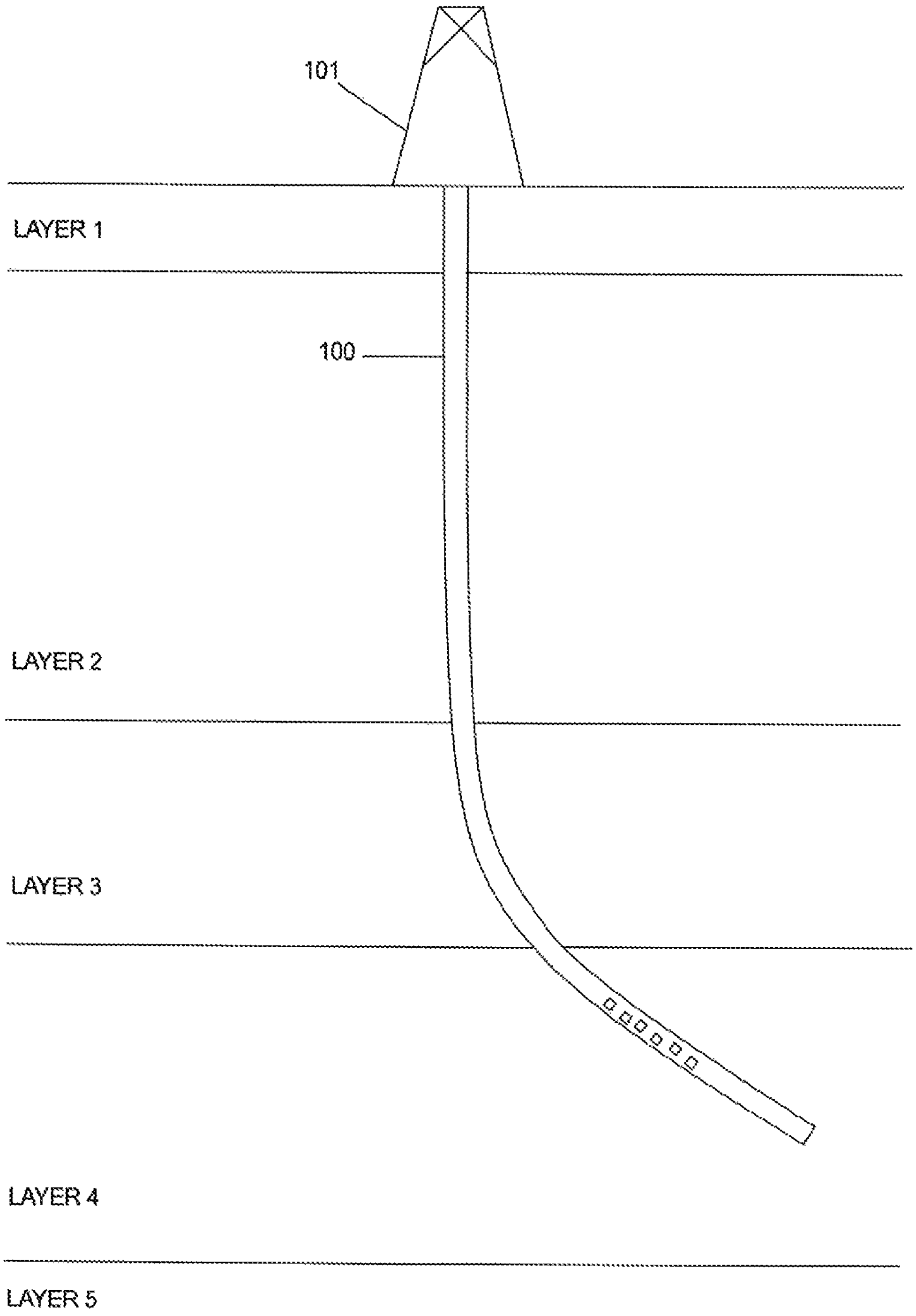
FIG. 1F is a side profile of a single well seismic profile being performed at a wellbore site.
Figure 1G:
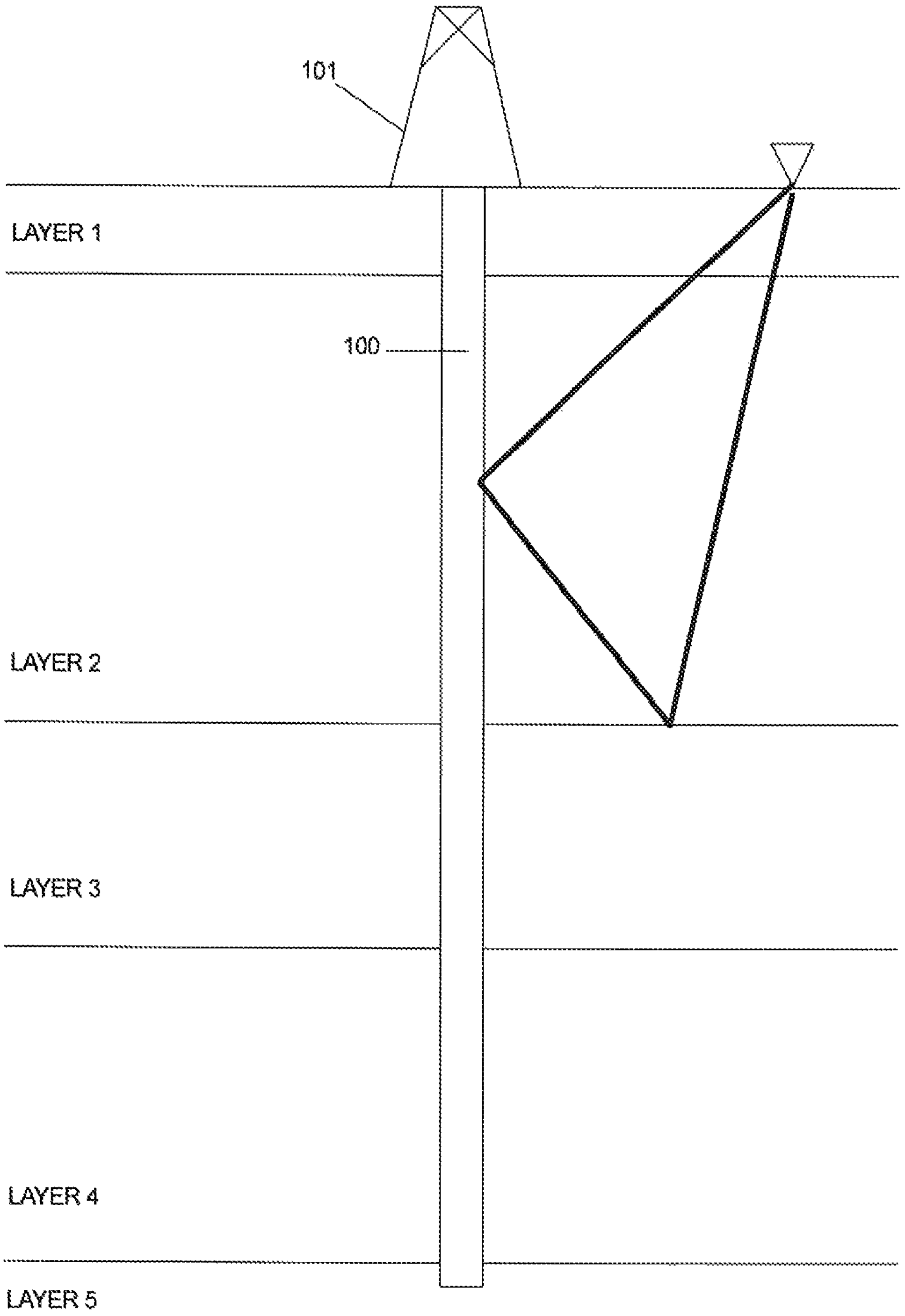
FIG. 1G is a side profile of an offset vertical seismic profile being performed at a wellbore site.
Figure 1H:
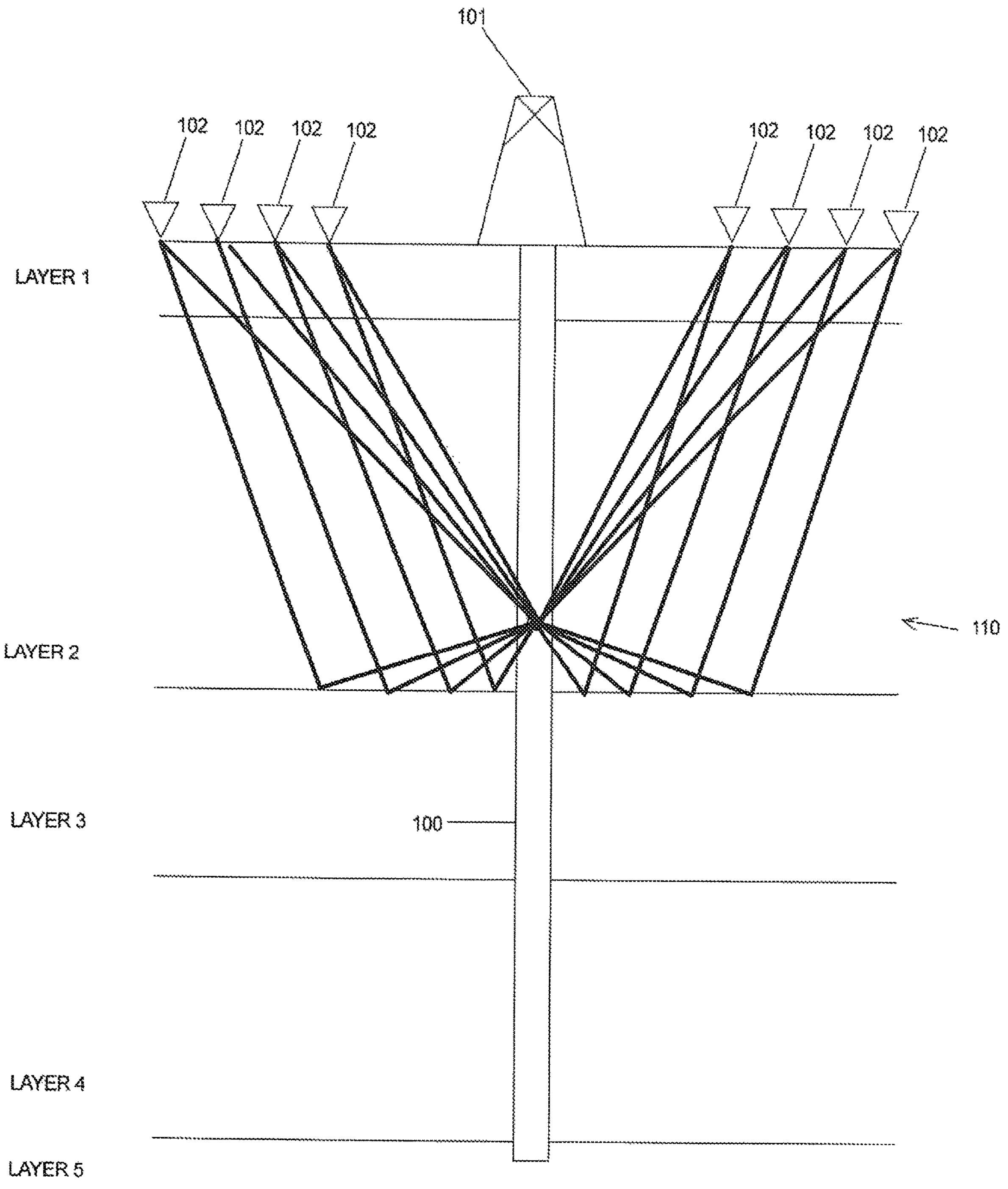
FIG. 1H is a side profile of a vertical seismic profile versus offset test being performed at a wellbore site.
Figure 1I:
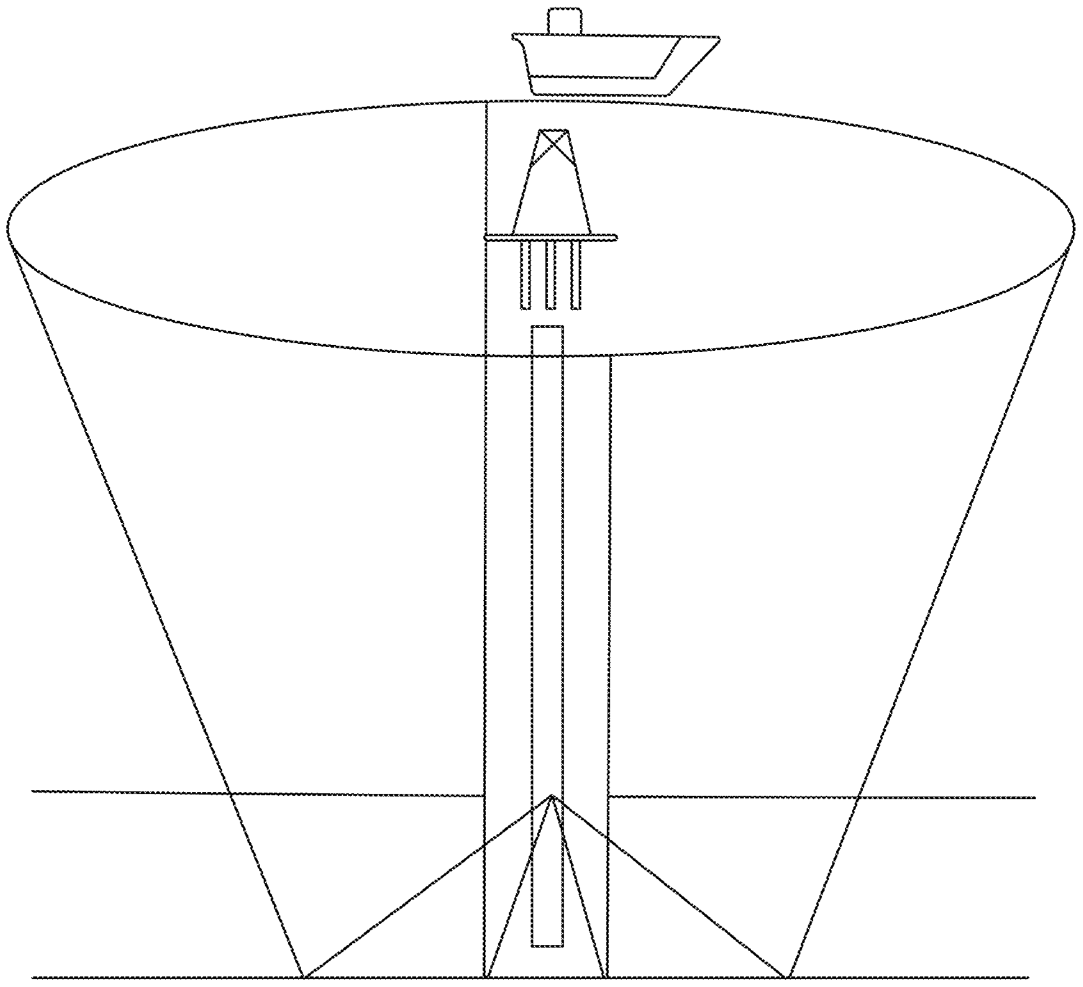
FIG. 1I is a side profile of a walkaround vertical seismic profile being performed at a wellbore site.
Figure 1J:
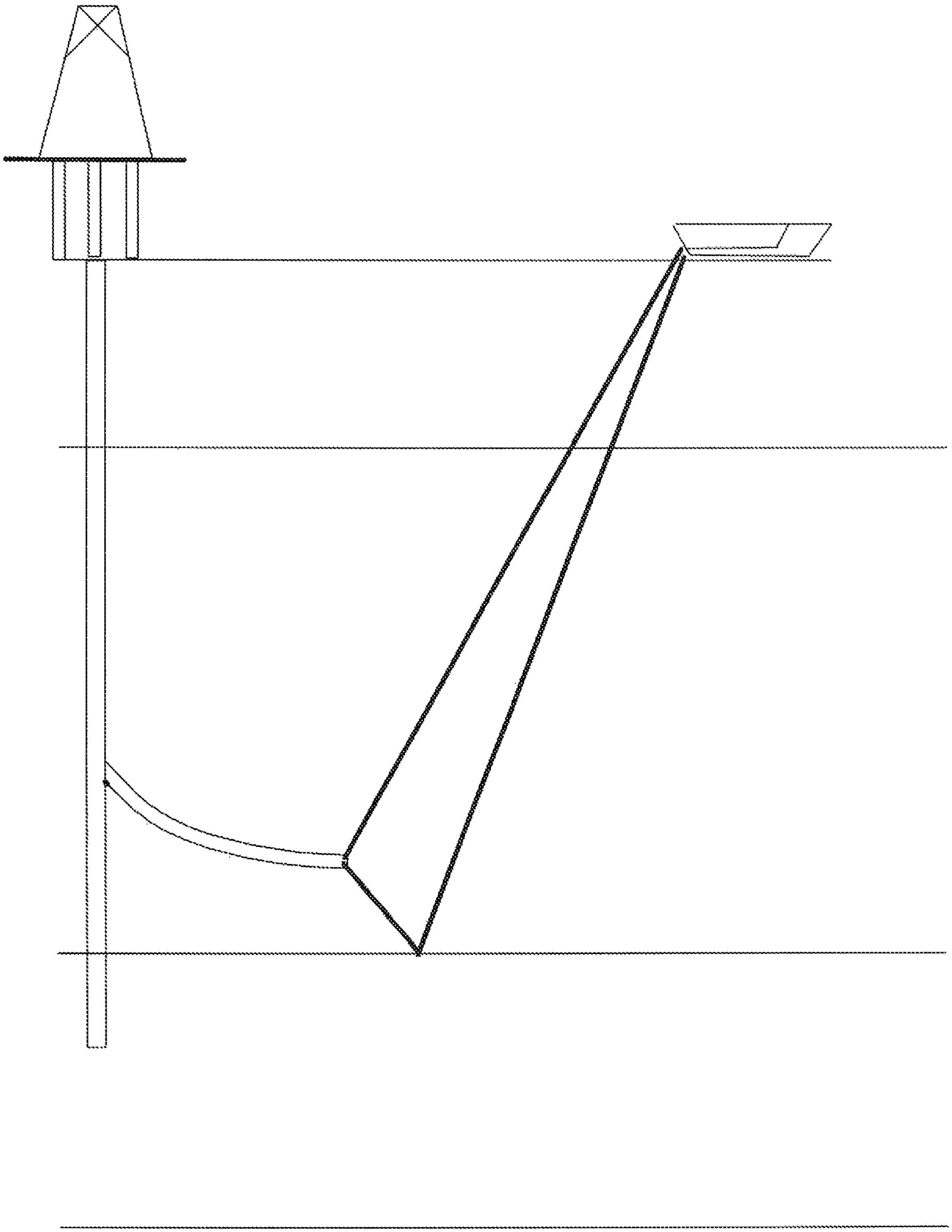
FIG. 1J is a side profile of a seismic while drilling test being performed at a wellbore site.
Figure 1K:
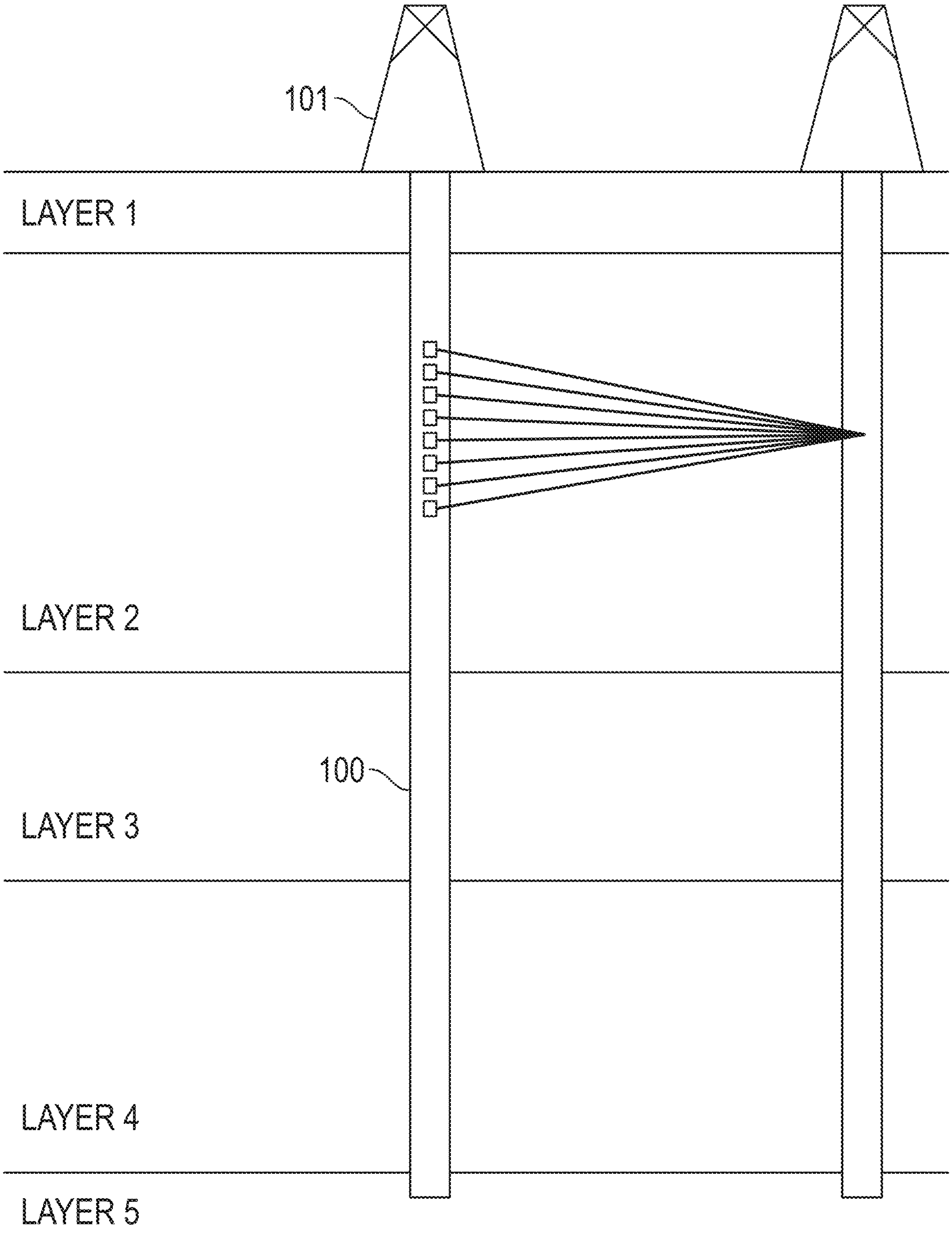
FIG. 1K is a side profile of a cross-well seismic test being performed at a wellbore site.
Figure 1L:
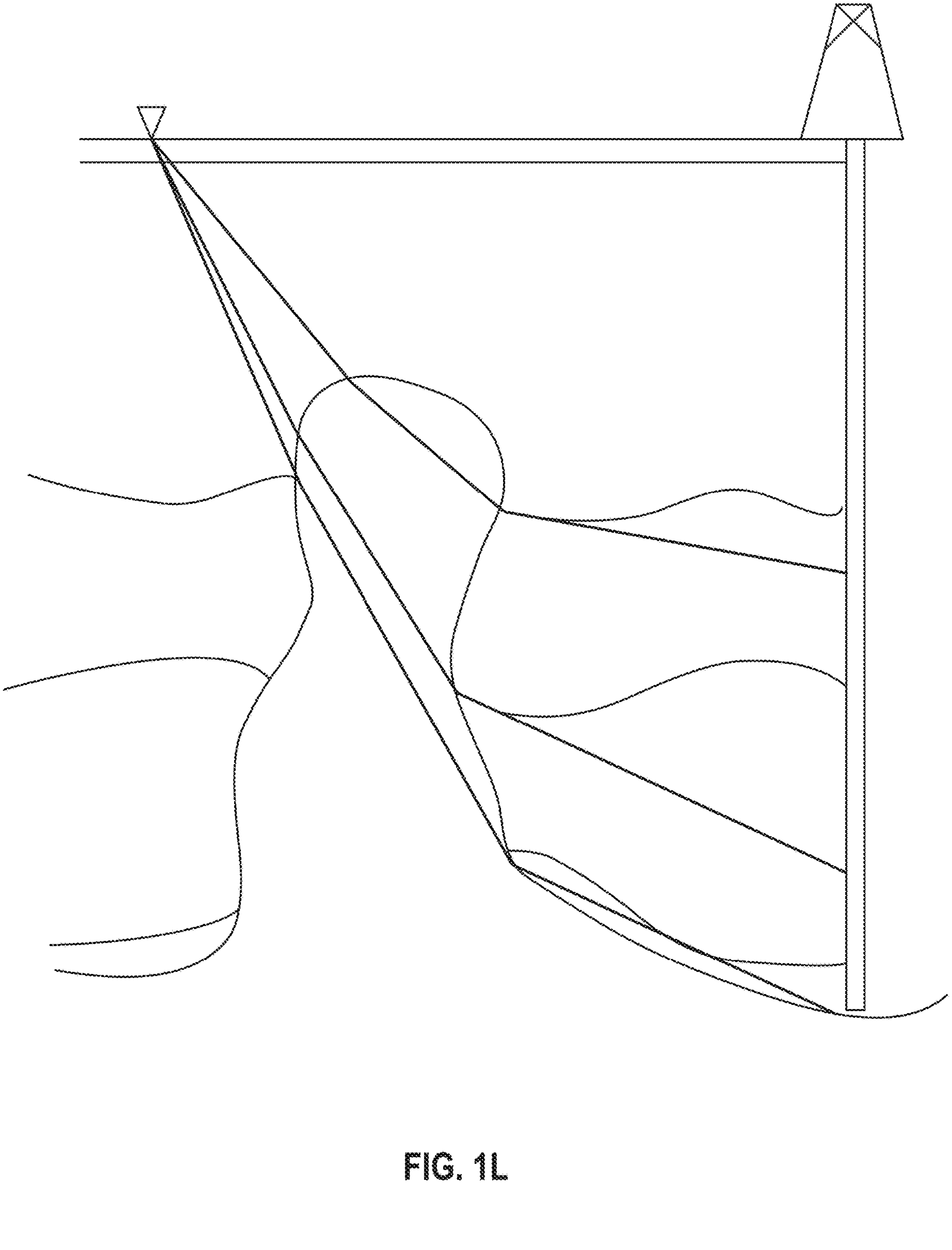
FIG. 1L is a side profile of a salt proximity test being performed at a wellbore site.
Figure 1M:
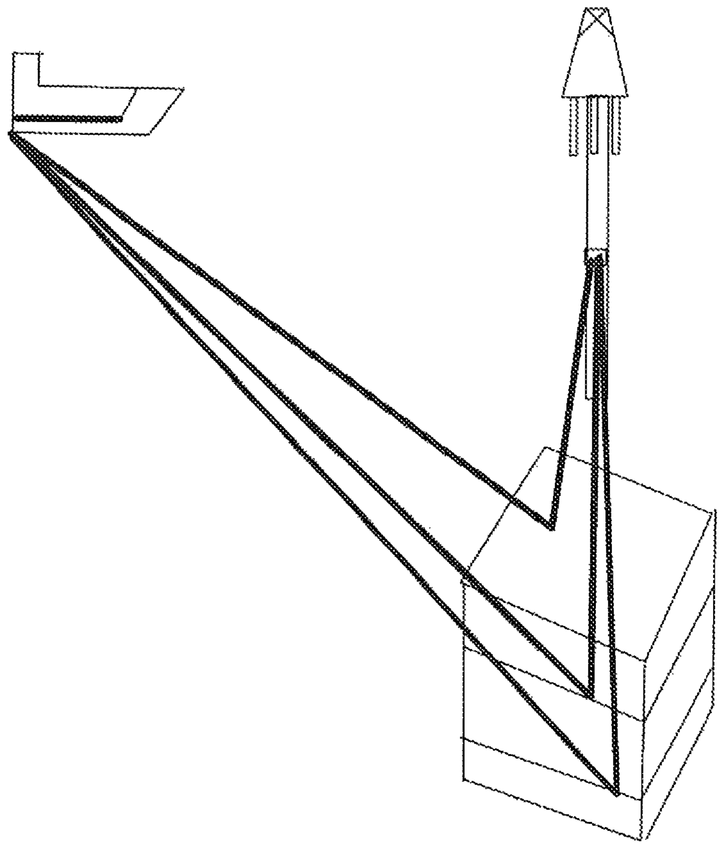
FIG. 1M is a side profile of a three dimensional vertical seismic profile test being performed at a wellbore site.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure also provide methods that may be performed to achieve a stated goal, including controlling components described in the specification. In some embodiments, the methods described may be performed by circuits and/or computers that are configured to perform such tasks.

Figure 6:
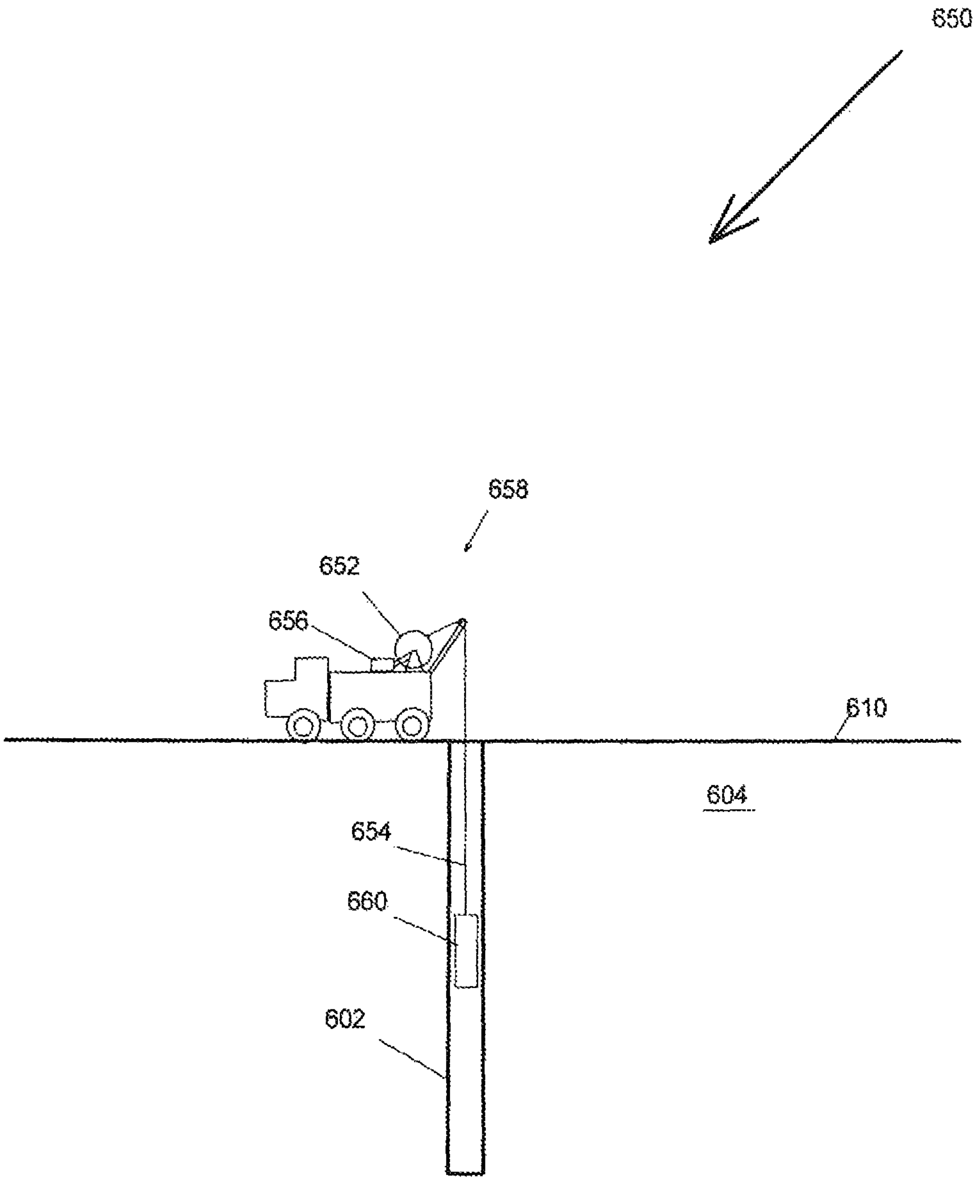
FIG. 6 is a side elevational view of a wireline operation being performed in which seismic analysis may be conducted.

Referring to FIG. 6, wireline operations are performed after the creation of a wellbore. In embodiments, seismic analysis can be performed at the surface 610, within the wellbore, or both. In one example embodiment, wireline operations are conducted to obtain data related to the method described in relation to FIG. 2. To this end, a general description of wireline operations will be described to acquaint the reader with the apparatus and methods used.

Wireline operations may be accomplished to obtain subsurface petrophysical and geophysical data related to the geological stratum 604 encountered by the wellbore 602. In these operations, a wireline truck 650 is provided. The wireline truck 650 is provided with a spool 652 that houses a cable 654. The cable 654 may be a single strand or multiple strand cable unit. The cable 654 is configured to allow sensors and equipment to be lowered into the wellbore 602 such that the sensors and equipment may conduct required surveys. The lowering action may be accomplished by a motor 656 that is connected to the spool 652. Within the wireline truck 650, an operator may activate and deactivate the motor 656 and control associated gearing to allow the spool 652 to unwind the cable 654 at a desired rate. Sensors 658 may be provided to ascertain the amount of cable 654 that has been unspooled to allow the operator to identify the location of equipment suspended by the cable 654.

Equipment supported by the cable can be a single instrument package or multiple instrument packages. In the case of multiple instrument packages, such instrument packages may be modular such that different types of packages may be added together according to the needs of the operator. Different types of packages may include, but not be limited to:

Packer systems
Pressure meter testing systems
Nuclear measurement systems
Optical spectrometry systems
Pressure monitoring systems
Resistivity calculation systems
Sonic and ultrasonic tool systems
Borehole seismic tool systems
Nuclear magnetic resonance tool systems
Pressure control systems.
Tractor and motion enhancement systems
Power Generation systems
Telemetry and Data recordation systems
Computing systems Generally, the different modular systems described above may be added together, as needed, to form a logging tool 660 that may be called or known as a sonde. The logging tool 660 is lowered into the wellbore 602 to a desired point in the geological stratum 604 and the appropriate system is actuated. The wireline operator may take sensor readings at one point or may take multiple readings while changing the elevation of the logging tool 660. The resulting string of measurements may be called a "log". Wireline operations may also be used in remediation of a wellbore in order to increase production of hydrocarbons. Such operations, known as remediation or "workovers" may include augmenting existing wellbore parameters.

The purpose of aspects disclosed here provide a method to process downhole sensor data in order to automatically retrieve high-resolution and high-definition interval velocity information without having to rely on tedious (and sometimes inaccurate, often manual) time-picking. As an example, data may be collected during a field survey and then processed, allowing continuation of field activities. Such capabilities are not currently possible with conventional technologies. Different types of field analysis techniques are present. FIG. 1 discloses several types of techniques, including (a) check shot Vertical Seismic Profile (VSP), (b) walkaway VSP, (c) microseismic (d) walkabove VSP, (e) zero-offset VSP ("ZOVSP"), (f) single well seismic, (g) offset VSP, (h) VSP Amplitude Versus Offset (AVO), (i) walkaround VSP, (j) SWD (seismic while drilling), (k) cross well seismic, (I) salt proximity, (m) 3D VSP.

Considering the check-shot VSP and ZOVSP, velocity (c) along the borehole can be estimated from arrival time picks for direct P or S arrivals using the following equation:

$$c(z) = \frac{T(z+\Delta/2) - T(z-\Delta/2)}{\Delta} \qquad \text{EQUATION 1}$$

where z is depth, Δ/2 is the distance from depth z, where arrival time of P or S wave (T) is measured. Equation 1 indicates that to accurately determine the interval velocity c, accurate time picks are needed for P-(or S-) wave arrivals. Furthermore, measured at two neighboring points close to the depth z, spatial resolution depends on the distance delta. This requirement is consistent for all types of VSP survey configurations.

In embodiments, aspects of the method described are used to produce a high-resolution velocity profile. In this method, a relation between the amplitude of strain and particle velocity is used to estimate c(z) (a high-resolution velocity profile) at a specific depth (z). The method does not rely on any time-picking, tedious, relatively precise, manual, high-precision time-picking. The method also does not rely on traditional error-prone automated arrival detection algorithms.

The theory behind the method described is starting to emerge in the field of exploration strain seismology, which has been evolving in relation to the interpretation of seismic datasets acquired using optical fiber cables (hDVS in SLB).

Figure 2:
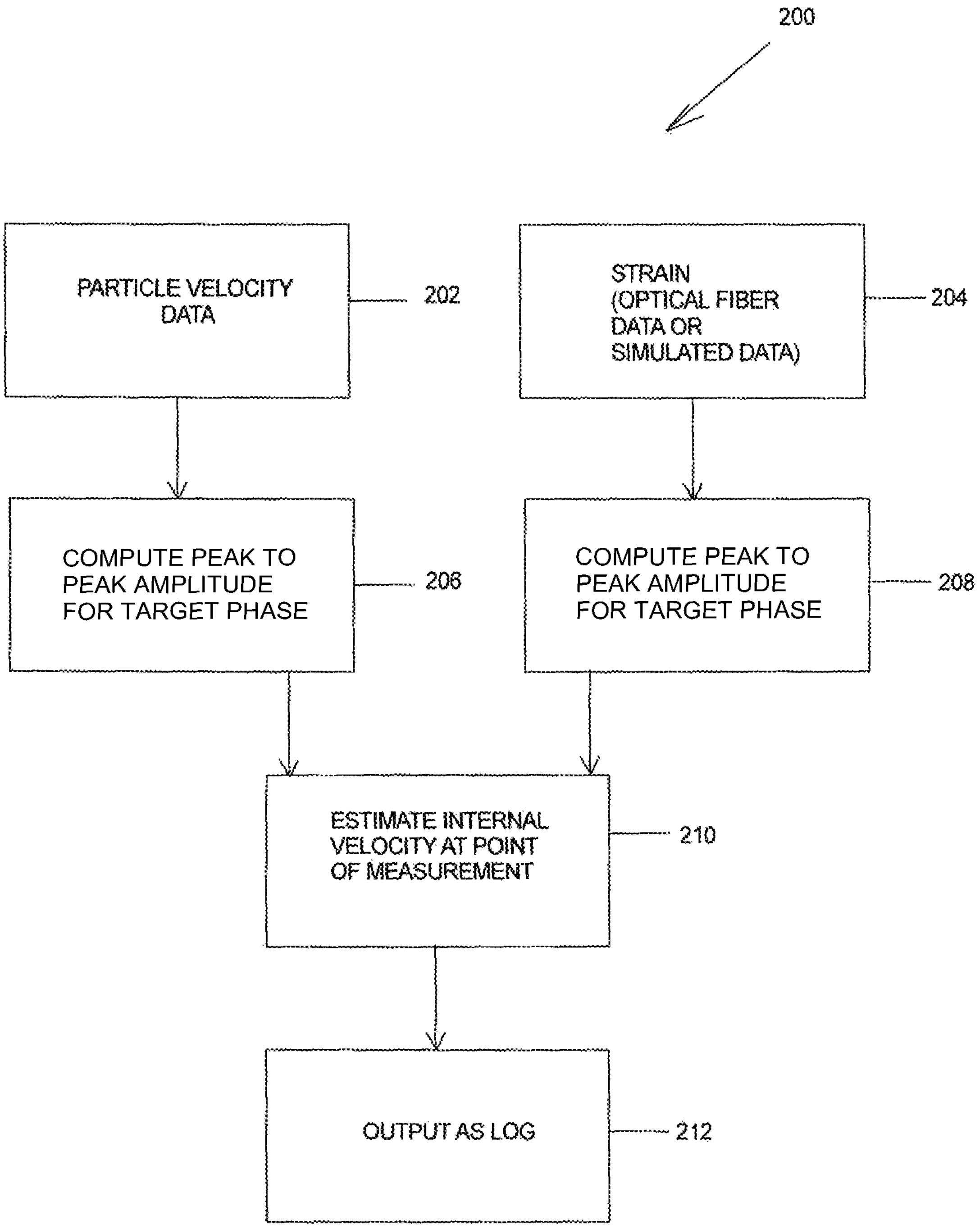
FIG. 2 is a method for performing full automation of high-resolution interval velocity estimation for check-shot and other vertical seismic profile-type datasets.

FIG. 2 shows the computation method 200 in one embodiment of the disclosure. At 202, the method entails obtaining particle velocity data from a geological borehole seismic survey. At 204, the method also entails obtaining strain data related to the geological borehole seismic survey. In one embodiment, the strain data may be related to optical fiber data. In another example embodiment, the strain data may be related to simulation data. The method progresses at 206 for computing a peak-to-peak amplitude for a target phase. The method step at 206 follows the step at 202. At 208, the method provides for computing a peak-to-peak amplitude for a target phase using the strain data at 204.

In aspects of the disclosure, particle velocity and strain check-shot VSP data is obtained from field seismic activities at 202 and 204. For steps 202 and 204, sampling should occur at the same depth because the method requires seismic waveform amplitude for each depth. The following data types may be used:

Fiber optic data (hDVS or DAS in the industry in general)
Simulated DAS data from geophone.

As a source of geophone data, at 202, the following data types may be used:

Geophone recordings
Inverted particle velocity using the StrainToVelocity (STV)-Multi method.

The next step entails computing peak-to-peak amplitude for direct P arrivals (and S-wave arrivals if available). At 206, 208 the time window does not need to be defined for the peak-to-peak amplitude reading since the P-wave is usually the biggest amplitude arrival in the record. In case of noisy data, the time window may be defined, the algorithm uses a priori knowledge of P-wave arrivals from various databases.

At 210, the phase velocity at depth z may be estimated as $$c(z) = \text{V\_p2p}(z)/\text{D\_p2p}(z) \quad \text{EQUATION 1A}$$

Considering the 1D wave propagation problem, which is applicable for check-shot VSP and ZOVSP, the following relation is established for infinitesimal strain and particle velocity.

$$\varepsilon(z, t) = \frac{1}{c} v(z, t) \quad \text{EQUATION 2}$$

where epsilon is the infinitesimal strain and v is the particle velocity recording at the sensor depth (z). In the case of optical fiber and simulated DAS recordings, equation (1) may not be adequate since strain is finite rather than infinitesimal strain. In those cases, $$d(z, t) = \frac{-2i}{GL}\left(\sin k\left(\frac{GL}{2}\right)\right) cv(z, t). \quad \text{EQUATION 3}$$

The above equation has been employed for the conversion of infinitesimal/finite strain data (epsilon, d) to particle velocity (v). However, it is not used to estimate phase velocity (c) using infinitesimal/finite strain (epsilon, d) and particle velocity (v) previously.

For instance, if infinitesimal strain and particle velocity data is available, using equation (2), the phase velocity (c) is estimated as follows:

$$c(z) = \frac{v(z, t)}{\varepsilon(z, t)}. \quad \text{EQUATION 4}$$

Equation 4 indicates that the phase velocity at depth z can be estimated by the division of amplitude of two seismic traces, and it is constant for t. The application of this equation is quite challenging since amplitude contains noise. To account for potential noise, amplitude information in the seismic data is used, such as peak-to-peak amplitude. To estimate the velocity, equation 5 uses the peak-to-peak amplitude within a certain time window that contains the direct P wave (and S-wave arrivals if available).

$$c(z) \sim \frac{v_{P2P}(z)}{\varepsilon_{P2P}(z)} \quad \text{EQUATION 5}$$

Figure 3A:
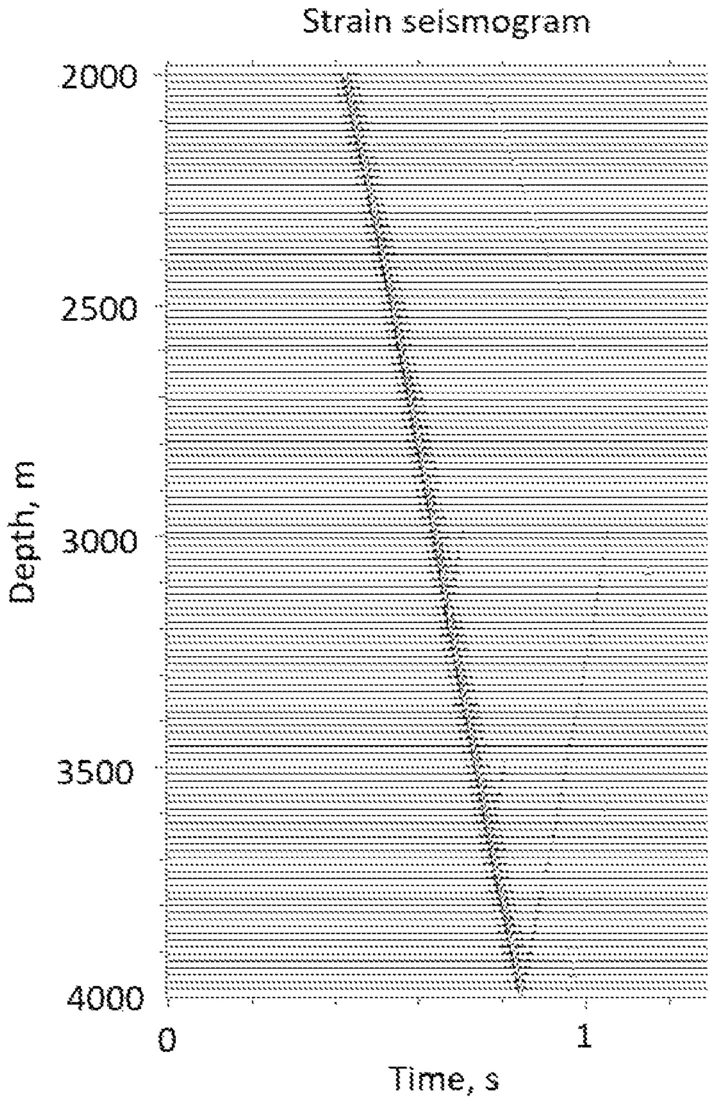
FIG. 3A is an example embodiment of a check-shot vertical seismic profile data for strain.
Figure 3B:
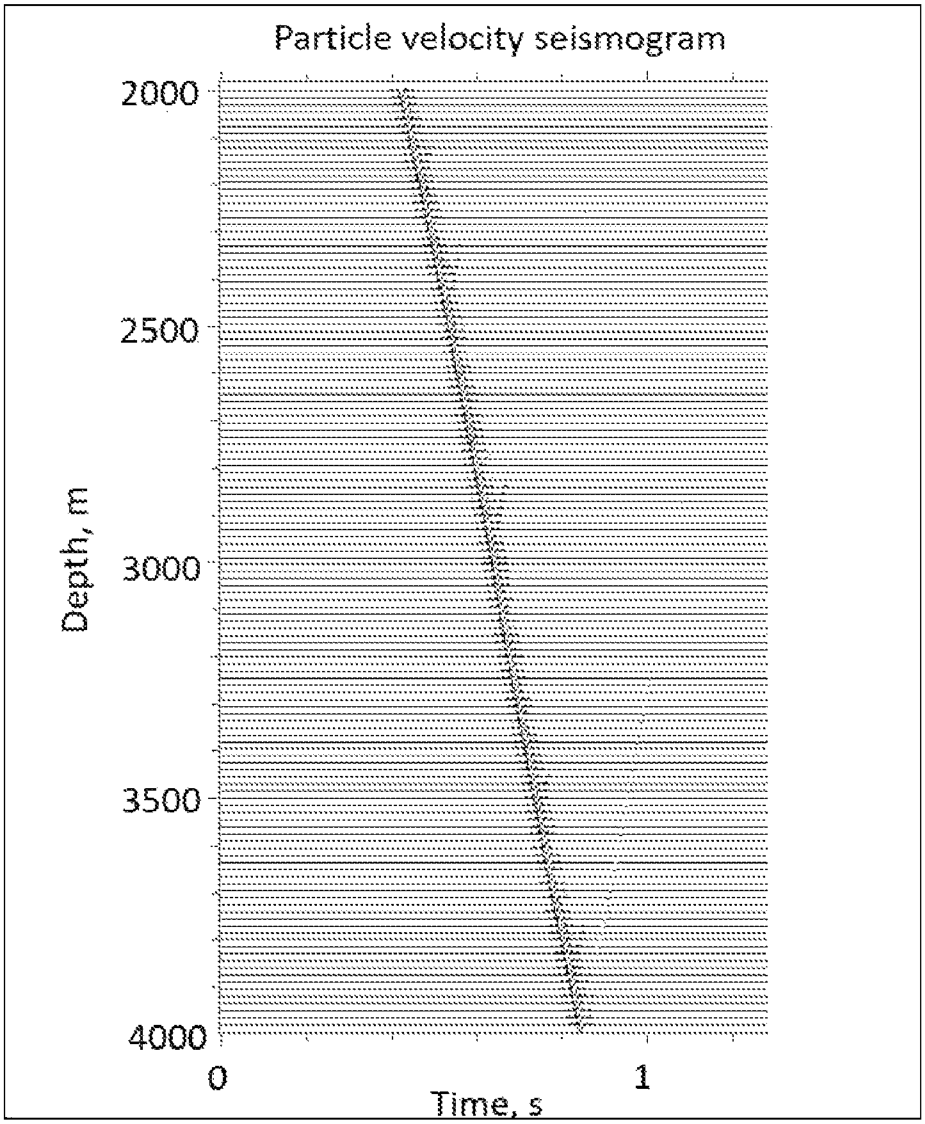
FIG. 3B is an example embodiment of a check-shot vertical seismic profile data for particle velocity.

FIGS. 3A and 3B show the synthetic waveform in the velocity domain as well as the strain domain. In one embodiment, it is assumed that the P wave arrives within a time window between 250 msec-1000 msec from the shot time.

Figure 4:
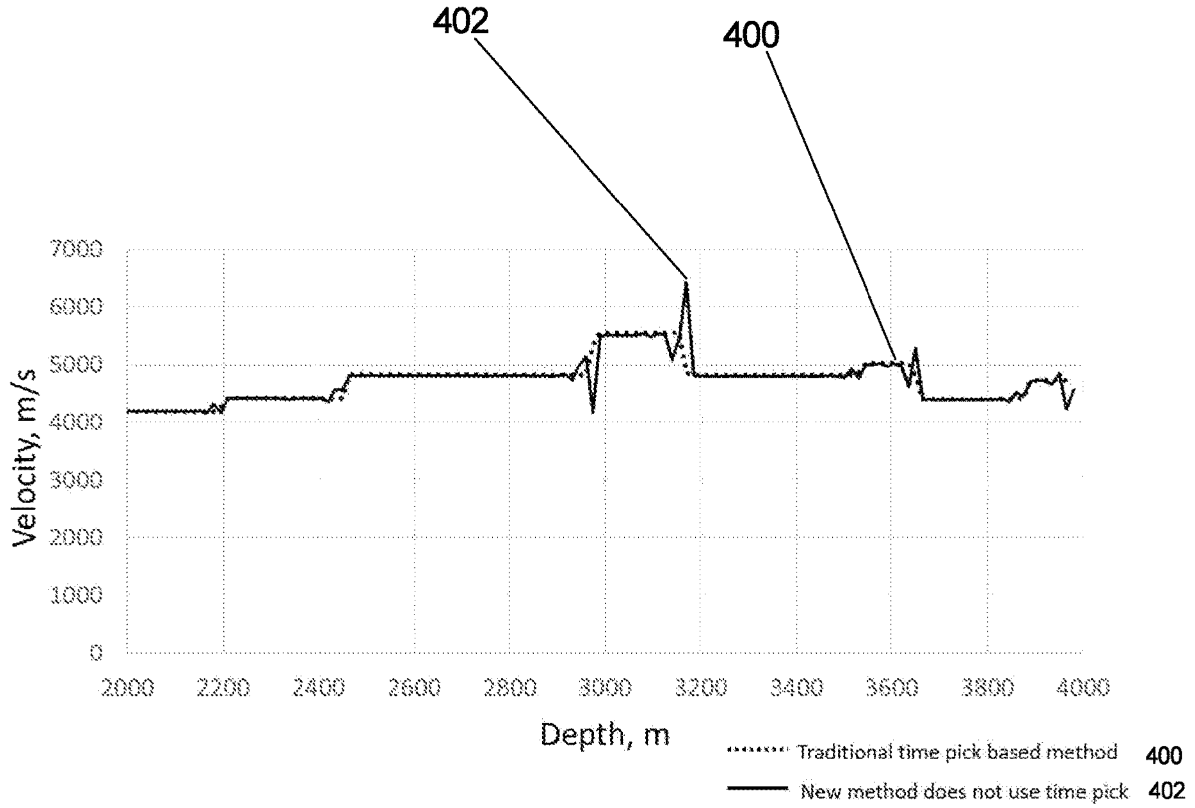
FIG. 4 is a graph showing comparisons of conventional time picking velocity and fully automated velocity calculations described in FIG. 2.

FIG. 4 shows the phase velocity 402 estimated by the method described in relation to FIG. 2. The one from the traditional method using precise (theoretical) time pick is provided by the result listed at 400. The new method provides a comparable result to the traditional method without using time pick.

Figure 5:
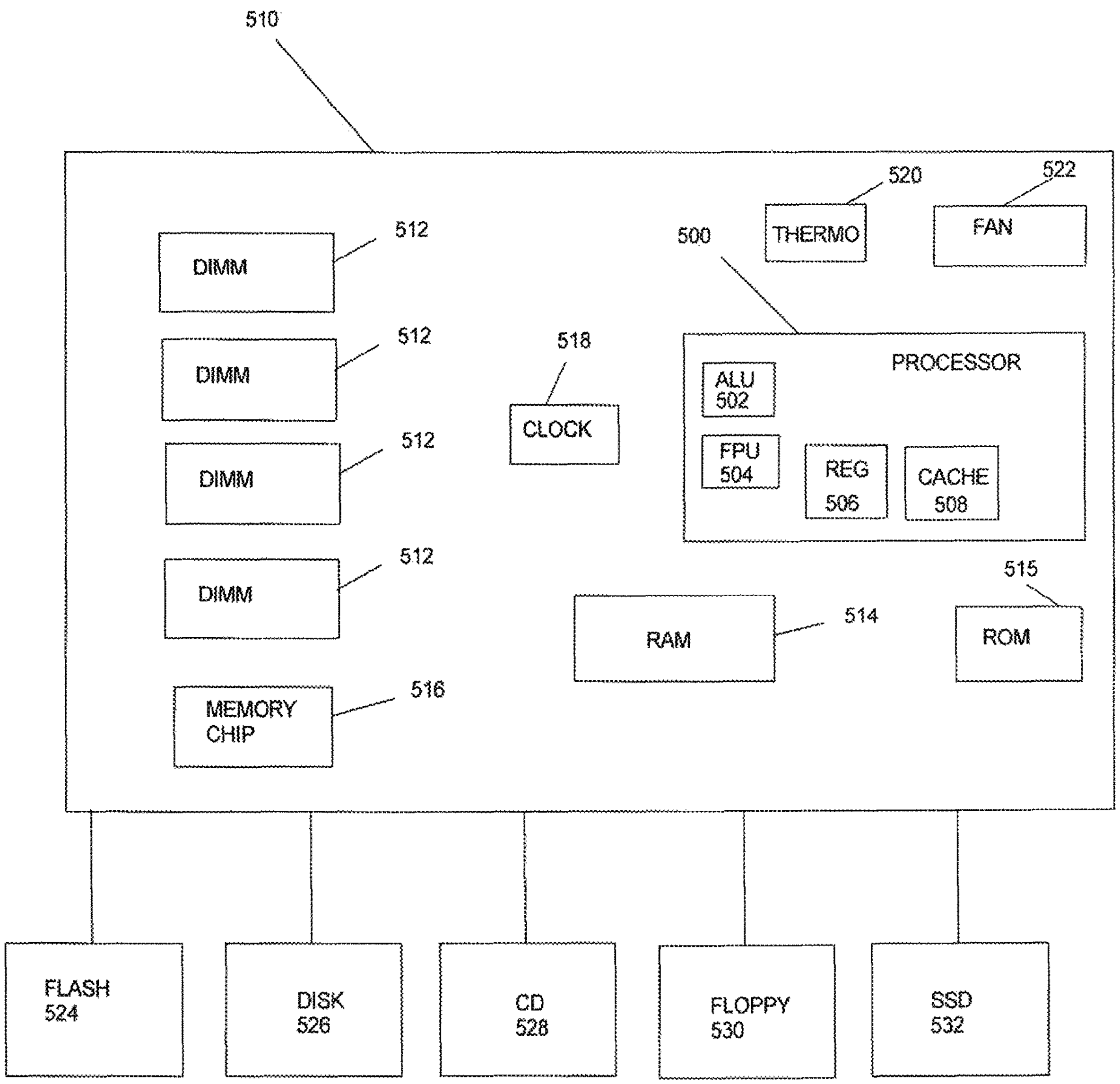
FIG. 5 is a computer apparatus used in performing methods and controlling apparatus for the operations of FIG. 1.

In such embodiments, referring to FIG. 5, a computing apparatus is used in the control of equipment to perform analysis steps described in FIG. 2. In FIG. 5, a processor 500 is provided to perform computational analysis for instructions provided. The instruction provided, code, may be written to achieve the desired goal and the processor 500 may access the instructions. In other embodiments, the instructions may be provided directly to the processor 500.

In other embodiments, other components may be substituted for generalized processors. These specifically designed components, known as application specific integrated circuits ("ASICs") are specially designed to perform the desired task. As such, the ASICs generally have a smaller footprint than generalized computer processors. The ASICs, when used in embodiments of the disclosure, may use field programmable gate array technology, that allows a user to make variations in computing, as necessary. Thus, the methods described herein are not specifically held to a precise embodiment, rather alterations of the programming may be achieved through these configurations.

In embodiments, when equipped with a processor 500, the processor 500 may have arithmetic logic unit ("ALU") 502, a floating point unit ("FPU") 504, registers 506 and a single or multiple layer cache 508. The arithmetic logic unit 502 may perform arithmetic functions as well as logic functions. The floating point unit 504 may be math coprocessor or numeric coprocessor to manipulate numbers more efficiently and quickly than other types of circuits. The registers 506 are configured to store data that will be used by the processor 500 during calculations and supply operands to the arithmetic unit 502 and store the result of operations. The single or multiple layer caches 508 are provided as a storehouse for data to help in calculation speed by preventing the processor 500 from continually accessing random access memory ("RAM") 514.

Aspects of the disclosure provide for the use of a single processor 500. Other embodiments of the disclosure allow the use of more than a single processor. Such configurations may be called a multi-core processor where different functions are conducted by different processors to aid in calculation speed. In embodiments, when different processors are used, calculations may be performed simultaneously by different processors, a process known as parallel processing.

The processor 500 may be located on a motherboard 510. The motherboard 510 is a printed circuit board that incorporates the processor 500 as well as other components helpful in processing, such as memory modules ("DIMMS") 512, random access memory 514, read only memory 515, non-volatile memory chips 516, a clock generator 518 that keeps components in synchronization, as well as connectors for connecting other components to the motherboard 510. The motherboard 510 may have different sizes according to the needs of the computer architect. To this end, the different sizes, known as form factors, may vary from sizes from a cellular telephone size to a desktop personal computer size. The motherboard 510 may also provide other services to aid in functioning of the processor 500, such as cooling capacity. Cooling capacity may include a thermometer 520 and a temperature controlled fan 522 that conveys cooling air over the motherboard 510 to reduce temperature.

Data stored for execution by the processor 500 may be stored in several locations, including the random access memory 514, read only memory 515, flash memory 524, computer hard disk drives 526, compact disks 528, floppy disks 530 and solid state drives 532. For booting purposes, data may be stored in an integrated chip called an EEPROM, that is accessed during start-up of the processor 500. The data, known as a Basic Input/Output System ("BIOS"), contains, in some example embodiments, an operating system that controls both internal and peripheral components.

Different components may be added to the motherboard or may be connected to the motherboard to enhance processing. Examples of such connections of peripheral components may be video input/output sockets, storage configurations (such as hard disks, solid state disks, or access to cloud-based storage), printer communication ports, enhanced video processors, additional random access memory and network cards.

The processor and motherboard may be provided in a discrete form factor, such as personal computer, cellular telephone, tablet, personal digital assistant or other component. The processor and motherboard may be connected to other such similar computing arrangement in networked form. Data may be exchanged between different sections of the network to enhance desired outputs. The network may be a public computing network or may be a secured network where only authorized users or devices may be allowed access.

As will be understood, method steps for completion may be stored in the random access memory, read only memory, flash memory, computer hard disk drives, compact disks, floppy disks and solid state drives.

Different input/output devices may be used in conjunction with the motherboard and processor. Input of data may be through a keyboard, voice, Universal Serial Bus ("USB") device, mouse, pen, stylus, Firewire, video camera, light pen, joystick, trackball, scanner, bar code reader and touch screen. Output devices may include monitors, printers, headphones, plotters, televisions, speakers and projectors.

Figure 7:
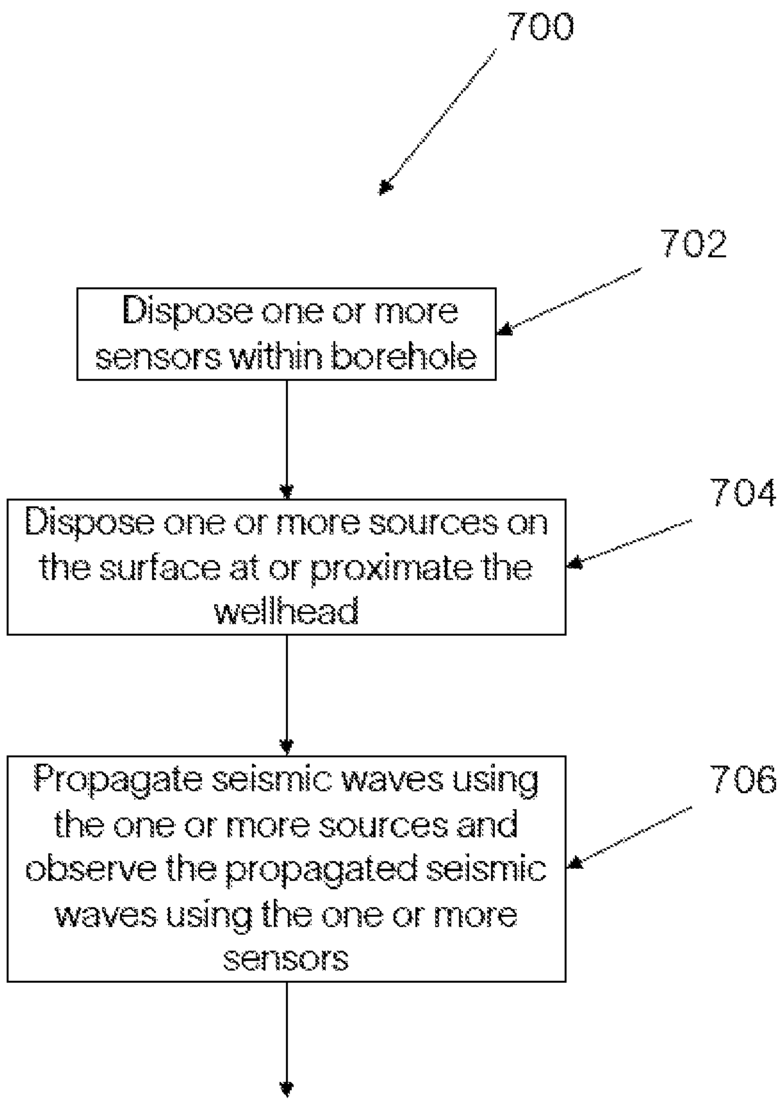
FIG. 7 is a method for obtaining a check-shot or zero-offset vertical seismic profile.

Now referring to FIG. 7, a method 700 for obtaining a check-shot or zero-offset vertical seismic profile is disclosed. At step 702, one or more sensors ("receivers") are disposed within the borehole. In one or more embodiments, the receivers may be geophones or fiber optic sensors. At step 704, one or more sources are disposed on the surface at or proximate the wellhead of the borehole. The one or more sources may be vibrators, explosives, and/or air guns. Further, at step 706, seismic waves are propagated by the one or more sources and the one or more receivers observe the seismic waves propagated along the borehole. The observations of the seismic waves by the one or more receivers may include particle velocity and strain data. Said particle velocity and strain data may then be used as discussed above in FIG. 2 to perform a full automation of high-resolution interval velocity estimation.

Figure 8:
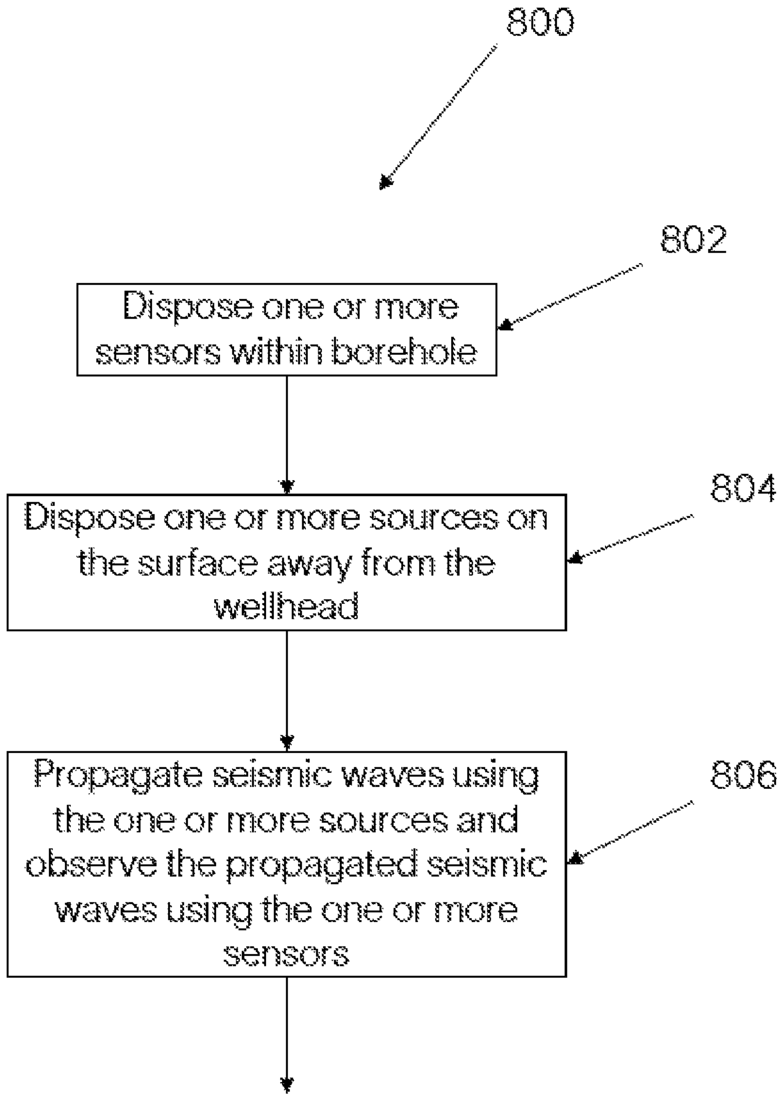
FIG. 8 is a method for obtaining a walkaway, walkabove, or 3D vertical seismic profile.

Now referring to FIG. 8, a method 800 for obtaining a walkaway, walkabove, or 3D vertical seismic profile is disclosed. At step 802, one or more sensors ("receivers") are disposed within the borehole. In one or more embodiments, the receivers may be geophones or fiber optic sensors. At step 804, one or more sources are disposed on the surface away from the wellhead of the borehole. In one or more embodiments, the one or more sources may be disposed along a line moving away from the borehole, which will produce a walkaway vertical seismic profile. In other embodiments, the one or more sources may be disposed above a surface projection of the wellbore, which will produce a walkabove vertical seismic profile. In other embodiments, the one or more sources may be disposed in a 2D plane on the surface, which will produce a 3D vertical seismic profile. The one or more sources may be vibrators, explosives, and/or air guns. Further, at step 806, seismic waves are propagated by the one or more sources and the one or more receivers observe the propagated seismic waves. The observations of the seismic waves by the one or more receivers may include particle velocity and strain data. Said particle velocity and strain data may then be used as discussed above in FIG. 2 to perform a full automation of high-resolution interval velocity estimation.

Figure 9:
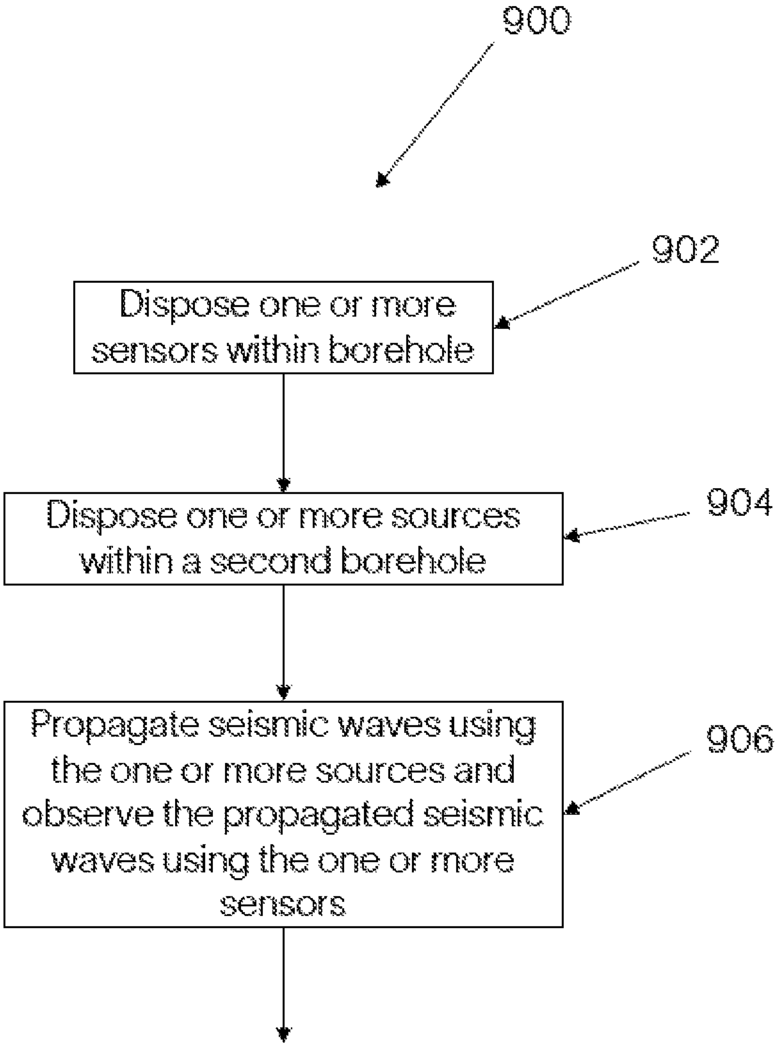
FIG. 9 is a method for obtaining a cross well vertical seismic profile.

Now referring to FIG. 9, a method 900 for obtaining a cross well vertical seismic profile is disclosed. At step 902, one or more sensors ("receivers") are disposed within the borehole. In one or more embodiments, the receivers may be geophones or fiber optic sensors. At step 904, one or more sources are disposed within a second borehole. The one or more sources may be vibrators, explosives, and/or air guns. Further, at step 906, seismic waves are propagated by the one or more sources and the one or more receivers observe the propagated seismic waves. The observations of the seismic waves by the one or more receivers may include particle velocity and strain data. Said particle velocity and strain data may then be used as discussed above in FIG. 2 to perform a full automation of high-resolution interval velocity estimation.

In one or more embodiments, a microseismic profile may be obtained by disposing one or more sensors ("receivers") within the borehole and observing seismic waves generated by earthquakes.

In the following description, description is provided related to measurements obtained during wireline operations generally performed, as described above. As will be understood, various changes and alterations may be accomplished during the attainment of the desired measurements and, as such, methods described should not be considered limiting.

In one example embodiment, a method is disclosed. The method may comprise testing and obtaining particle velocity data from at least one geological stratum in a field location. The method may further comprise obtaining strain data from the at least one geological stratum in the field location. The method may further comprise performing a peak-to-peak amplitude analysis for the particle velocity data for a target phase. The method may further comprise performing a peak-to-peak amplitude analysis for the strain data for the target phase. The method may further comprise estimating a velocity of waves in the at least one geological stratum based upon the peak-to-peak amplitude analysis for the particle velocity data for the target phase and the peak-to-peak amplitude analysis for the strain data for the target phase.

In another example embodiment, the method may be performed wherein the testing and obtaining strain data is obtained from a geophone.

In another example embodiment, the method may be performed wherein the strain data is from optical fiber data.

In another example embodiment, the method may be performed wherein the particle velocity data is obtained from a geophone.

In another example embodiment, the method may further comprise outputting the velocity in a form of a log.

In another example embodiment, the method may be performed wherein the log is displayed as a chart.

In another example embodiment, the method may be performed wherein the testing and obtaining the particle velocity data from the at least one geological stratum in the field location and the obtaining the strain data from the at least one geological stratum in the field location is at one location.

In another example embodiment, the method may be performed wherein the one location has a specified depth.

In another example embodiment, the method may be performed wherein the strain data is simulated data.

In another example embodiment, the method may be performed wherein the strain data is obtained through field testing.

In another example embodiment, the method may be performed wherein the velocity data is Inverted particle velocity.

In another example embodiment, the method may be performed wherein the inverted particle velocity is obtained using the Strain-To-Velocity multi-method.

In another example embodiment, the method may be performed wherein the velocity of waves is estimated by a division of amplitude of two seismic traces.

In another example embodiment, the method may be performed wherein the velocity of waves is estimated by an equation of c(z)=V_p2p(z)/D_p2p(z).

In another example embodiment, the method may be performed wherein the particle velocity data is obtained from a checkshot vertical profile data set.

In another example embodiment, the method may be performed wherein the particle velocity data is obtained from a walkaway vertical seismic profile.

In another example embodiment, the method may be performed wherein the particle velocity data is obtained from a microseismic survey.

In another example embodiment, the method may be performed wherein the particle velocity data is obtained from a walkabove vertical seismic profile.

In another example embodiment, the method may be performed wherein the particle velocity data is obtained from a zero-offset vertical seismic profile.

In another example embodiment, the method may be performed wherein the particle velocity data is obtained from a cross-well survey.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method, comprising:

disposing one or more sensors within a borehole;

disposing one or more sources on a surface at or proximate a wellhead of the borehole at a field location;

propagating seismic waves using the one or more sources;

obtaining particle velocity data from at least one geological stratum in the field location;

obtaining strain data from the at least one geological stratum in the field location;

performing a peak-to-peak amplitude analysis for the particle velocity data for at least one of a direct P wave, a reflected P wave, a direct S wave, or a reflected S wave;

performing a peak-to-peak amplitude analysis for the strain data for the at least one of the direct P wave, the reflected P wave, the direct S wave, or the reflected S wave; and estimating a velocity of waves in the at least one geological stratum based upon the peak-to-peak amplitude analysis for the particle velocity data and the peak-to-peak amplitude analysis for the strain data.

2. The method according to claim 1, wherein the one or more sensors are geophones.

3. The method according to claim 1, wherein the one or more sensors are fiber optic sensors.

4. The method according to claim 1, wherein the particle velocity data is inverted particle velocity.

5. The method according to claim 1, wherein the velocity of waves is estimated by a division of amplitude of two seismic traces.

6. The method according to claim 1, wherein the velocity of waves is estimated by an equation of c(z)=V_p2p(z)/D_p2p(z), where c is velocity, and z is depth.

7. The method according to claim 1, wherein the particle velocity data is obtained from a checkshot vertical profile data set.

8. The method according to claim 1, wherein the particle velocity data is obtained from a zero-offset vertical seismic profile.

9. A method, comprising:

disposing one or more sensors within a borehole;

disposing one or more sources on a surface away from a wellhead of the borehole at a field location;

propagating seismic waves using the one or more sources;

obtaining particle velocity data from at least one geological stratum in the field location;

obtaining strain data from the at least one geological stratum in the field location;

performing a peak-to-peak amplitude analysis for the particle velocity data for at least one of a direct P wave, a reflected P wave, a direct S wave, or a reflected S wave;

performing a peak-to-peak amplitude analysis for the strain data for the at least one of the direct P wave, the reflected P wave, the direct S wave, or the reflected S wave; and estimating a velocity of waves in the at least one geological stratum based upon the peak-to-peak amplitude analysis for the particle velocity data for a target phase and the peak-to-peak amplitude analysis for the strain data for the target phase.

10. The method according to claim 9, wherein the one or more sources are disposed along a line moving away from the borehole.

11. The method according to claim 9, wherein the one or more sources are disposed above a surface projection of a wellbore of the borehole.

12. The method according to claim 9, wherein the one or more sources are disposed in a 2D plane on the surface.

13. The method according to claim 9, wherein the one or more sensors are geophones.

14. The method according to claim 9, wherein the one or more sensors are fiber optic sensors.

15. The method according to claim 9, wherein the particle velocity data is inverted particle velocity.

16. The method according to claim 9, wherein the velocity of waves is estimated by a division of amplitude of two seismic traces.

17. The method according to claim 9, wherein the velocity of waves is estimated by an equation of c(z)=V_p2p(z)/D_p2p(z), where c is velocity, and z is depth.

* * * * *